(12) United States Patent  
Matsumoto

(10) Patent No.: US 7,419,302 B2  
(45) Date of Patent: Sep. 2, 2008

(54) LINEAR GUIDE DEVICE AND ROLLING ELEMENT ACCOMMODATING BELT FOR THE SAME

(75) Inventor: Jun Matsumoto, Kanagawa (JP)

(73) Assignee: NSK Ltd., Tokyo (JP)

( * ) Notice: Subject to any disclaimer, the term of this patent is extended or adjusted under 35 U.S.C. 154(b) by 334 days.

(21) Appl. No.: 11/272,175

(22) Filed: Nov. 14, 2005

(65) Prior Publication Data

US 2006/0159373 A1    Jul. 20, 2006

(30) Foreign Application Priority Data

Nov. 11, 2004 (JP) .......................... P. 2004-328095  
Jan. 28, 2005 (JP) .......................... P. 2005-021214  
Apr. 19, 2005 (JP) .......................... P. 2005-120899

(51) Int. Cl.  
    *F16C 29/06*     (2006.01)

(52) U.S. Cl. .................................................. 384/45

(58) Field of Classification Search ............. 384/43–45, 384/51  
See application file for complete search history.

(56) References Cited

U.S. PATENT DOCUMENTS

| | | | |
|---|---|---|---|
| 4,563,045 | A | 1/1986 | Katayama |
| 4,799,805 | A | 1/1989 | Tanaka |
| 6,733,179 | B2 | 5/2004 | Michioka et al. |
| 2002/0118898 | A1 | 8/2002 | Blaurock et al. |
| 2002/0136472 | A1 | 9/2002 | Mochizuki et al. |
| 2003/0185470 | A1 | 10/2003 | Lee |

FOREIGN PATENT DOCUMENTS

| | | |
|---|---|---|
| DE | 72 34 477 U | 12/1972 |
| DE | 41 03 672 A1 | 8/1992 |
| DE | 199 57 110 A1 | 5/2001 |
| DE | 203 18 163 U1 | 4/2004 |
| EP | 846880 A1 | 6/1998 |
| EP | 0 961 045 A2 | 12/1999 |
| EP | 1 199 487 A1 | 4/2002 |
| JP | 05 196035 A | 8/1993 |
| JP | 2607993 B2 | 2/1997 |
| JP | 10-89358 A | 4/1998 |
| JP | 10-318257 A | 12/1998 |
| JP | 11-2241 A | 1/1999 |
| JP | 11-247854 A | 9/1999 |
| JP | 3243415 B2 | 10/2001 |
| JP | 3263005 B2 | 12/2001 |
| JP | 3299450 B2 | 4/2002 |
| JP | 3447849 B2 | 7/2003 |

OTHER PUBLICATIONS

Extended European Search Report Apr. 11, 2008.

*Primary Examiner*—Thomas R Hannon  
(74) *Attorney, Agent, or Firm*—Sughrue Mion, PLLC

(57) ABSTRACT

In a rolling element accommodating belt having a rolling element accommodating section for individually accommodating a plurality of balls at predetermined intervals while the plurality of balls are rolling and circulating in an infinite circulating passage of linear guide, the rolling element accommodating belt accommodates the balls in the rolling element accommodating section and aligns the balls in the direction of aligning balls in the infinite circulating passage. The rolling element accommodating section includes: a restraint accommodating section for restricting the accommodated balls in all directions; and a no-restraint accommodating section in which the accommodated balls are not restrained at least in one direction.

6 Claims, 23 Drawing Sheets

DIRECTION OF ALIGNING BALLS

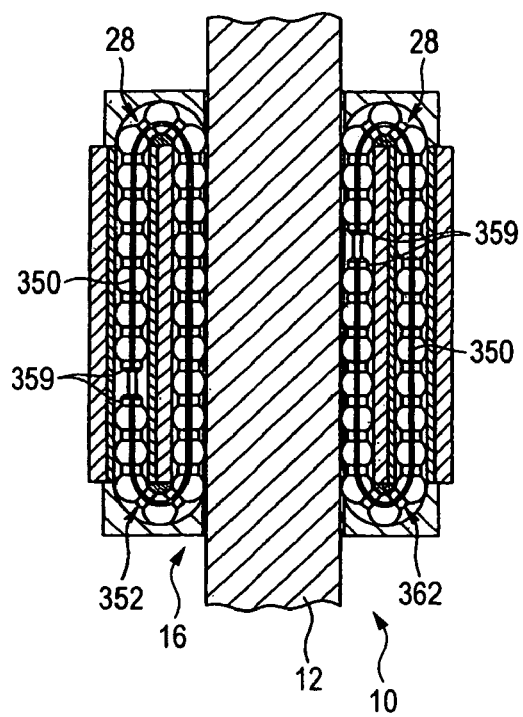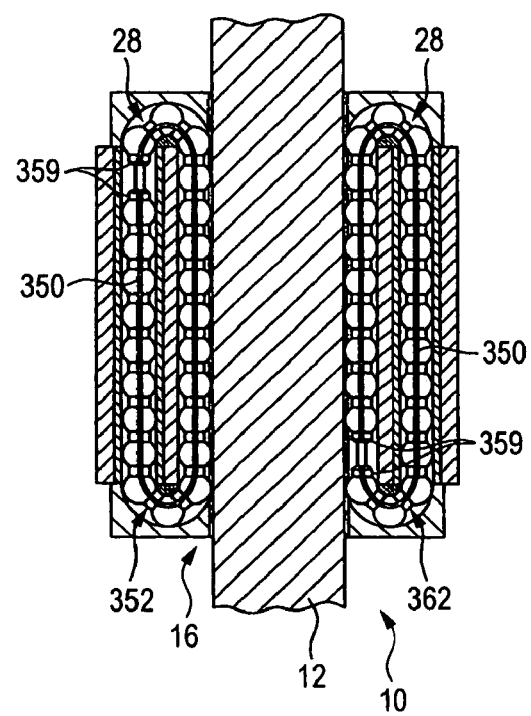

LINEAR GUIDE DEVICE AND ROLLING ELEMENT ACCOMMODATING BELT FOR THE SAME

The present application claims foreign priorities based on Japanese Patent Application No. 2004-328095, filed Nov. 11, 2004, Japanese Patent Application No. 2005-021214, filed Jan. 28, 2005 and Japanese Patent Application No. 2005-120899, filed Apr. 19, 2005, the contents of which are incorporated herein by reference.

BACKGROUND OF THE INVENTION

1. Technical Field

The present invention relates to a linear guide device and a rolling element accommodating belt for the linear guide device.

2. Related Art

A linear guide device having a plurality of rows of infinite circulating passages includes: as shown in FIG. 29, a guide rail 12; a slider 16 arranged being capable of moving relatively with this guide rail 12; and a plurality of rolling elements 46 (in this example, balls) which roll between the guide rail 12 and the slider 16 under a load. The guide rail 12 has a rolling element guide face 14 on which the rolling elements 46 roll. The slider 16 includes: a slider body 17; and a pair of lid members (end caps) 22 attached to both end portions of the slider body 17 in the moving direction.

For example, as shown in FIG. 30, the slider body 17 includes a load rolling element guide face 18 which is opposed to the rolling element guide face 14 of the guide rail 12. The load rolling element guide face 18 and the rolling element guide face 14 form a rolling element track passage 26 that is a region for giving a load to the rolling elements. The slider body 17 also includes a rolling element return passage 20 in which the rolling elements roll under no load. Further, in the pair of lid members 22, the direction change passages 24 are formed which respectively continue to both end portions of the rolling element track passage 26 and the rolling element return passage 20.

A plurality of rows of the infinite circulating passages 28 are composed of the rolling element track passage 26, the pair of the direction change passage 24 and the rolling element return passage 20. When a plurality of the rolling elements 46 roll in each infinite circulating passage 28, the slider 16 can be relatively moved in the guide rail 12.

In the linear guide device, when the slider is moved relatively with the guide rail, the rolling elements move while they are rolling in the same direction. Therefore, the adjoining rolling elements are rubbed with each other. Accordingly, it is impossible for the rolling elements to roll smoothly. Therefore, an intensity of noise is increased and the rolling elements are early abraded.

In order to solve the above problems, a rolling element accommodating belt is proposed in which the generation of noise is suppressed and in order to smoothly operate the linear guide device, the rolling elements are aligned in the infinite circulating passage so as to compose a rolling element row. (Concerning this technique, refer to Japanese Patent No. 2607993 (Patent Document 1), Japanese Patent No. 3243415 (Patent Document 2), Japanese Patent No. 3447849 (Patent Document 3), Japanese Patent No. 3299450 (Patent Document 4), JP-A-11-247854 (Patent Document 5), Japanese Patent No. 3263005 (Patent Document 6), and JP-A-10-318257 (Patent Document 7))

For example, as shown in FIG. 31, according to the technique described in Patent Document 1, the rolling element accommodating belt 150 includes a spacer member 151 having concave portions on both side faces. This spacer member 151 is provided between the adjoining rolling elements 46 in the infinite circulating passages. Both sides of the adjoining spacer members 151 in the width direction of the infinite circulating passage are connected to each other by a connecting member 152. A portion in which the rolling element 46 is accommodated, which will be referred to as a rolling element accommodating section-hereinafter, is formed by the space member 151 and the connecting member 152 so that the accommodated rolling element 46 can be restrained in all directions and prevented from coming off from the rolling element accommodating section. Due to the above structure, it becomes possible to prevent the rolling elements from being rubbed and competed with each other. Accordingly, the circulating property of the rolling elements can be improved.

Further, for example, as shown in FIG. 30, according to Patent Document 2, the rolling element accommodating belt 62 includes: a spacer member 51; and a connecting member 52. The spacer member 51 has a pair of rolling element contact faces 54a, 54b slidably coming into contact with the outer circumference of the rolling element. The connecting member 52 is a belt-shaped member made of flexible thin material. This connecting member 52 connects the adjoining spacer members to each other. The rolling element 46 is interposed between the adjoining spacer members 51 so that the rolling element 46 can be restrained.

When the rolling elements 46 are accommodated in the rolling element accommodating section formed by the spacer member 51 and the connecting member 52, the rolling element row 62 is composed, and this rolling element row 62 is circulated in the infinite circulating passage 28. Due to the foregoing, it is possible to suppress the rolling elements 46 from being rubbed and competed with each other. Therefore, the circulating property of the rolling elements 46 can be improved. In this case, this rolling element accommodating belt 50 is formed being provided with both end portions, and a gap is formed between both end portions 59 (top and tail) of the rolling element accommodating belt 50, that is, both end portions 59 of the rolling element accommodating belt 50 are not connected to each other. According to this rolling element accommodating belt, it is possible to omit a connecting work in which both end portions of the rolling element accommodating belt are connected to each other so as to form an endless rolling element accommodating belt. Further, it is easy to automatize the assembling process.

However, according to the technique described in Patent Document 1, the rolling element accommodating sections are respectively formed so that all the accommodated rolling elements can be prevented from coming off in all directions of the rolling element accommodating sections. That is, the size of the opening of each rolling element accommodating section is smaller than the outside dimension of the rolling element. Therefore, in order to assemble the rolling element into the rolling element accommodating section from the outside, it is necessary to push each rolling element into each rolling element accommodating section. This assembling work takes time and labor.

In the technique disclosed in Patent Document 1, it is disclosed that at the time of forming the rolling element accommodating belt, each rolling element is accommodated in each rolling element accommodating section by means of insertion forming. Therefore, the process, in which each rolling element is incorporated into each rolling element accommodating section, is not needed. However, in the case where each rolling element is accommodated in each rolling element accommodating section by means of insertion forming at the time of forming the rolling element accommodating belt, the following problems may be encountered. As described in Patent Document 3, in order to give a rotating property to the rolling element (ball), it is takes a very long period of time, and further it is difficult to give a smooth rotating property to the rolling element (ball). In some cases, it is impossible to give a rotating property to the rolling element (ball) according to the type of resin. Further, in order to form an appropriate clearance between the rolling element (ball) and the rolling element accommodating belt, a special process such as a process of sucking water or absorbing oil is needed.

On the other hand, according to the technique described in Patent Document 4, in the rolling element accommodating section, all the accommodated rolling elements can pass through in the direction of both sides of the rolling element accommodating belt. That is, this rolling element accommodating section is formed in the azimuth so that the rolling element can be allowed to come off from the rolling element accommodating section. In this case, in the rolling element accommodating belt, the connecting members are guided by the groove-shaped guide portions formed in the slider on both side in the width direction of the infinite circulating passage. However, according to the technique described in Patent Document 4, all the accommodated rolling elements are accommodated being allowed so that they can come off from the rolling element accommodating section. Accordingly, the rolling element accommodating belt and the rolling elements are moved in the infinite circulating passage independently from each other in the directions of both sides of the rolling element accommodating belt. Consequently, the connecting member of the rolling element accommodating belt is strongly rubbed with the guide section, which might damage the connecting member.

Further, the linear guide device described in Patent Document 1 is composed in such a manner that the spacer members 151 of the rolling element accommodating belt 150 completely hold the rolling elements 46. Therefore, when the connecting member 152 of the rolling element accommodating belt 150 is elastically deformed into an arcuate shape in the direction change passage 24 formed in the lid member (end cap) 22, the spacer members 151 of the rolling element accommodating belt 150 and the rolling elements 46 interfere with each other on the inner circumferential side of the direction change passage 24. Therefore, an excessively strong tensile force is repeatedly given to the connecting member 152 of the rolling element accommodating belt 150. Accordingly, there is a possibility that the connecting member 152 of the rolling element accommodating belt 150 is broken.

In the linear guide device described in Patent Document 5, clearance is made between the rolling element passing in the direction change passage and the end portion on the outer circumferential side of the spacer member. However, in this case, the rolling element rolls in the direction change passage while the spacer member and the rolling element are pushing to each other, that is, while the connecting member is being given a force. Accordingly, in the same manner as that of the case described in Patent Document 1, there is a possibility that the connecting member of the rolling element accommodating belt is broken.

When the above linear guide device is manufactured, the rolling element row is incorporated into each infinite circulating passage by the procedure shown in FIGS. 32(a) to 32(f).

Specifically, the procedure is executed as follows. First of all, as shown in FIGS. 32(a) and 32(b), one of the lid members (end caps) 22 is removed from the slider 16. From the thus opened portion, the rolling element row 62 is inserted into the infinite circulating passage 28. The rolling element row 62 is inserted into the infinite circulating passage 28 until the state shown in FIG. 32(c) can be obtained. In the same manner, as shown in FIG. 32(d), the rolling element row 62 is successively assembled into each infinite circulating passage 28. As shown in FIG. 32(e), after the rolling element rows 62 have been assembled into all infinite circulating passages 28, the lid member 22, which was removed before, is attached to the slider body 17. Finally, as shown in FIG. 32(f), the slider 16, into which the rolling element rows 62 have been assembled, is attached to the guide rail 12.

However, according to this method of manufacturing a linear guide device, when the rolling element row 62 is assembled into each infinite circulating passage 28, as shown in FIGS. 32(d) and 32(e), the end portions 59 of all the rolling element rows are located at the opening portions of the infinite circulating passages 28. Therefore, under the condition that the lid member 22 is attached to the slider body 17 and the opening portions of the infinite circulating passages 28 are closed, positions of the end portions 59 of all the rolling element row 62 are left being aligned.

For example, as described in Patent Document 6, existence of the end portions of the rolling element accommodating belt, which is formed being provided with end portions, can be a cause of obstructing the smooth operation of the linear guide device. That is, since the rolling element accommodating belt, which is bent in the direction change passage, tends to return to a linear shape, the end portion of the rolling element accommodating belt is abraded with the inner wall of the infinite circulating passage, and the circulating resistance is increased. Further, since the rolling element at the end portion of the rolling element accommodating belt proceeds into a region, in which a load is given to the rolling element, without being drawn by the proceeding rolling element, when the rolling element is moved from the no-load region into the load region, a high circulating resistance is generated. In this connection, Patent Document described above discloses a technique of reducing an increase in the circulating resistance described above, however, as long as the end portion itself is existing, it is difficult to completely eliminate the generation of the circulating resistance.

According to the above method of manufacturing a linear guide device, under the condition that the positions of the end portions 59 of all the rolling element rows 62 are aligned, the slider 16 is assembled to the guide rail 12. Due to the foregoing, for example, as shown in FIG. 32(f), in a linear guide device having a plurality of rows of the infinite circulating passages, in the case where the number of the rolling elements composing the rolling element row in the infinite circulating passage and the length of the rolling element accommodating belt are the same as those of the rolling element row in the other infinite circulating passage, the phases of the end portions of the rolling element rows coincide with each other in the aligning direction of the infinite circulating passages. Accordingly, a case, in which the end portion of the rolling element accommodating belt and each portion of the infinite circulating passage interfere with each other, substantially simultaneously occurs with respect to all the infinite circulating passages. Accordingly, vibration and noise are more increased at the time of operation.

In this connection, for example, Patent Document 7 discloses a technique in which end portions of the rolling element accommodating belts, which are opposed to each other, are connected with each other. However, even when the end portions are connected with each other, it is inevitable that the thus connected portion is formed into a special shape with respect to the shape of the other portion. Therefore, even in the case where the end portions are connected to each other, a circulating resistance is generated in the connected end portion which is different from the circulating resistance generated in the other portions. Therefore, when the phases of the infinite circulating passages coincide with each other in the aligning direction, a smooth operation of the linear guide device is obstructed.

According to the technique described in Patent Document 4, the rolling element accommodating section of the rolling element accommodating belt is composed in such a manner that the rolling element accommodating section allows the accommodated rolling element to come off. Therefore, when the rolling element row of this type rolling element accommodating belt is incorporated into the infinite circulating passage, under the condition that one of the lid members is removed from the slider, while the rolling element accommodating belt is intermittently fed into the infinite circulating passage according to the pitch of the rolling element accommodating sections, the rolling elements are accommodated in the rolling element accommodating section from the thus opened portion. In this way, the rolling element row is composed and inserted. After the rolling element row has been inserted into the infinite circulating passage, the lid member, which was removed before, is attached to the slider body. However, even in this technique described in Patent Document 4, positions of the end portions of all the rolling element rows are aligned. From this viewpoint, this technique described in Patent Document 4 is the same as the technique described in Patent Document 2. That is, the phases of the infinite circulating passages coincide with each other in the rolling element aligning direction. Therefore, the problem caused by vibration and noise, which are generated at the time of operation, can not be solved.

SUMMARY OF THE INVENTION

One or more embodiments of the invention provide a rolling element accommodating belt for a linear guide device in which a rolling element can be easily incorporated into the rolling element accommodating belt, and a connecting member of the rolling element accommodating belt can be prevented from wearing, and a linear guide device provided with the rolling element accommodating belt.

One or more embodiments of the invention provide a linear guide device capable of reducing vibration and noise at the time of operation.

One or more embodiments of the invention provide a linear guide device and a rolling element accommodating belt used for the linear guide device capable of preventing a connecting member of the rolling element accommodating belt from being repeatedly given an excessively strong tensile force.

A first aspect of the invention provides a rolling element accommodating belt for a linear guide device, which is used for the linear guide device having an infinite circulating passage in which a plurality of rolling elements are circulated while rolling, comprising: a plurality of rolling element accommodating sections for individually accommodating the rolling elements at predetermined intervals, wherein the rolling elements are aligned in a row in the infinite circulating passage while the rolling elements are being accommodated in the rolling element accommodating section, and the rolling element accommodating section is composed of at least two types of rolling element accommodating portions, the degrees of restraining the rolling elements from coming off of which are different from each other.

According to the first aspect of the invention, at least two types of rolling element accommodating sections described above are composed in such a manner that the degree of restraining the rolling element from coming off of one rolling element accommodating section is lower than that of the other rolling element accommodating section. Therefore, for example, compared with a rolling element accommodating belt in which all rolling element accommodating sections firmly restrain the rolling elements, it is possible to reduce a load of the work in which the rolling elements are incorporated into the rolling element accommodating belt. Further, for example, compared with a rolling element accommodating belt in which all rolling elements are seldom restrained in the directions of both side of the rolling element accommodating belt, the rolling elements can be made to work as a guide of guiding the rolling element accommodating belt in the infinite circulating passage.

A second aspect of the invention provides a rolling element accommodating belt for a linear guide device, which is used for the linear guide device, the linear guide device including: a guide rail having a rolling element guide face; a slider arranged being capable of relatively moving with respect to the guide rail, the slider having a load rolling element guide face forming a rolling element rail passage together with the rolling element guide face while the load rolling element guide face is opposing to the rolling element guide face, the slider also having a pair of direction change passages respectively continuing to both end portions of the rolling element rail passage, and the slider also having a rolling element return passage communicated with the pair of direction change passages; and a plurality of rolling elements circulating in an infinite circulating passage composed of the rolling element rail passage, the pair of direction change passages and the rolling element return passage while the plurality of rolling elements are rolling, the rolling element accommodating belt comprising: a plurality of rolling element accommodating sections for individually accommodating the rolling elements at predetermined intervals, wherein the rolling elements are accommodated in the rolling element accommodating section so as to align the rolling elements in a row in the infinite circulating passage, and the rolling element accommodating section has a restraint accommodating section for restraining the accommodated rolling elements in all directions so that they can not come off and also has a no-restraint accommodating section for restraining the accommodated rolling elements so that the accommodated rolling elements can be allowed to come off at least in one direction.

According to the second aspect of the invention, in the rolling element accommodating section, the restraint accommodating section restrains the rolling element so that it can not come off from the rolling element accommodating belt. Therefore, in the infinite circulating passage, the rolling element works as a guide of guiding the rolling element accommodating belt. Therefore, for example, there is no possibility that only the connecting member is strongly rubbed with the guide portion formed in the slider of the linear guide device. In the rolling element accommodating section, the no-restraint accommodating section allows the rolling element to come off with respect to the rolling element accommodating belt at least in one azimuth. Therefore, it is possible to easily incorporate the rolling element into the no-restraint accommodating section in the azimuth in which the rolling element is allowed to come off. In this connection, in the restraint accommodating section, when the rolling element is incorporated, it takes time and labor in the same manner as that of the related-art structure. However, since the number of the restraint accommodating sections is relatively small in the present invention, the total time necessary for incorporating the rolling elements into the rolling element accommodating sections can be reduced.

A third aspect of the invention provides a rolling element accommodating belt for a linear guide device according to claim 2, wherein the direction in which the rolling elements are allowed to come off is only one direction at the time of developing in the no-restraint accommodating section.

According to the third aspect of the invention, the rolling elements are restrained so that they can not come off in the azimuth except for the above one azimuth. Therefore, for example, at the time of assembling, even when an interval is formed between the slider and the assembling jig, the rolling elements are prevented from coming off.

A fourth aspect of the invention provides a rolling element accommodating belt for a linear guide device according to the second or third aspect of the invention, wherein the rolling element accommodating belt is formed being provided with end portions, and the rolling element accommodating section located in at least one end portion of the rolling element accommodating belt is the restraint accommodating section.

According to the fourth aspect of the invention, on the side of the restraint accommodating section, a forward end portion of the rolling element accommodating belt can be guided by the rolling elements. Accordingly, there is no possibility that the forward end portion of the rolling element accommodating belt is deflected and blocked when it proceeds. Accordingly, a row of the entire rolling elements formed by the rolling element accommodating belt can be more smoothly guided.

A fifth aspect of the invention provides a rolling element accommodating belt for a linear guide device according to one of the second to fourth aspects of the invention, wherein the number of the no-restraint accommodating sections is larger than the number of the restraint accommodating sections in the rolling element accommodating belt.

According to the fifth aspect of the invention, the number of the no-restraint accommodating sections is larger than the number of the restraint accommodating sections in the rolling element accommodating belt. Therefore, labor needed for assembling the restraint accommodating sections can be reduced.

A sixth aspect of the invention provides a linear guide device comprising a rolling element accommodating belt for a linear guide device described in one of the second to fifth aspects of the invention.

That is, it is possible to provide a linear guide device in which the rolling elements can be easily incorporated into the rolling element accommodating belt and the connecting members of the rolling element accommodating belt can be prevented from wearing away.

A seventh aspect of the invention provides a linear guide device according to the sixth aspect of the invention further comprising one or more restraint accommodating sections at all times in a straight line portion in the infinite circulating passage.

According to the seventh aspect of the invention, the rolling element accommodating belt is guided not only by the connecting members but also by the rolling elements in the linear section in the infinite circulating passage at all times. Therefore, it is possible to provide a highly reliable linear guide device in which the connecting members are more positively prevented from wearing.

According to the present invention, it is possible to provide a rolling element accommodating belt for a linear guide device characterized in that: the rolling elements can be easily incorporated into the rolling element accommodating belt; and the connecting members of the rolling element accommodating belt can be prevented from wearing. It is also possible to provide a linear guide device having the rolling element accommodating belt.

A eighth aspect of the invention provides a method of manufacturing a linear guide device, the linear guide device including: a guide rail; a slider arranged being capable of moving relatively with the guide rail; and a plurality of rolling elements rolling between the guide rail and the slider under a load, the guide rail having a rolling element guide face on which the rolling elements run, the slider including: a slider body having a load rolling element guide face composing a rolling element track passage together with the rolling element guide face being opposed to the rolling element guide face of the guide rail, the slider body also having a rolling element return passage on which rolling elements run under no load; and a pair of lid members attached to both end portions in the moving direction of the slider body, in which a direction change passage connected to both end portions of the rolling element track passage and the rolling element return passage is formed, wherein a plurality of rows of infinite circulating passages composed of the rolling element track passage, the pair of the direction change passages and the rolling element return passage are formed, the infinite circulating passage has a plurality of rolling element accommodating sections for individually accommodating the rolling elements, the rolling element accommodating sections accommodate the rolling elements so as to align the rolling elements in the infinite circulating passage, and a rolling element accommodating belt having end portions are incorporated into the linear guide device, the method of manufacturing a linear guide device comprising: a rolling element row insertion step in which the rolling element row is inserted into the infinite track passage of the slider from a portion from which one of the pair of lid members is removed; a lid member attaching step in which the removed lid member is attached to the slider body after the rolling element row insertion step; and a phase adjustment step in which the phase of the end portion of the rolling element accommodating belt in the aligning direction is adjusted so that it can be different from the phase of the end portion of the rolling element accommodating belt in the other infinite circulating passage in the aligning direction with respect to at least one rolling element row in the plurality of rows of infinite circulating passages after the lid member attaching step.

A ninth aspect of the invention provides a linear guide device comprising: a guide rail having a rolling element guide face; a slider arranged capable of being moved relatively with respect to the guide rail, having a load rolling element guide face composing a rolling element track passage together with the rolling element guide face being opposed to the rolling element guide face, also having a pair of direction change passages respectively continuing to both end portions of the rolling element tack passage, also having a rolling element return passage communicated with the pair of the direction change passages; and a plurality of rolling elements rolling and circulating in an infinite circulating passage composed of the rolling element track passage, the pair of direction change passage and the rolling element return passage; and a rolling element accommodating belt having a plurality of rolling element accommodating sections for individually accommodating the rolling elements, the rolling element accommodating belt accommodating the rolling elements in the rolling element accommodating sections and aligning the rolling elements in the aligning direction in the infinite circulating passage, the rolling element accommodating belt being provided with end portions, wherein the linear guide device is provided with a plurality of rows of infinite circulating passages, and the phase of the end portion of the rolling element accommodating belt of at least one row of the plurality of rows of the infinite circulating passages in the aligning direction is different from the phase of the end portion of the rolling element accommodating belt of the other infinite circulating passage in the aligning direction.

A tenth aspect of the invention provides a linear guide device according to the ninth aspect of the invention, wherein when an end portion of at least one row of the rolling element accommodating belt is located in the rolling element track passage, an end portion of at least one row of the rolling element accommodating belt in the other infinite circulating passage is located at a position except for the rolling element tack passage.

A eleventh aspect of the invention provides a linear guide device according to the ninth or tenth aspect of the invention, wherein the plurality of rows of the infinite circulating passages respectively have only one rolling element accommodating belt.

A twelfth aspect of the invention provides a linear guide device according to one of the ninth to eleventh aspects of the invention, wherein both end portions of the rolling element accommodating belt are opposed to each other in the infinite circulating passage being not coming into contact with each other.

A thirteenth aspect of the invention provides a linear guide device according to one of the ninth to twelfth aspects of the invention, wherein the rolling element accommodating section of the rolling element accommodating belt restrains the accommodated rolling element in all azimuths so that the accommodated rolling element can not come off.

A fourteenth aspect of the invention provides a linear guide device according to one of the ninth to twelfth aspects of the invention, wherein the rolling element accommodating section of the rolling element accommodating belt allows all the accommodated rolling elements or a portion of the accommodated rolling elements to come off at least in one azimuth.

According to the present invention, concerning the phase of the end portion of the rolling element accommodating belt in the aligning direction of the infinite circulating passage, the phase of the end portion of at least one row of the rolling element accommodating belt is different from the phase of the end portion of the rolling element accommodating belt of the other infinite circulating passage. Due to the foregoing, there is no possibility that the end portions of all rows of the rolling elements agree with each other. Therefore, it is possible to avoid the occurrence of a case, in which the end portion of the rolling element accommodating belt and each portion of the infinite circulating passage interfere with each other, with respect to all the infinite circulating passages. Accordingly, it is possible to provide a method of manufacturing a linear guide device capable of reducing vibration and noise at the time of operation. It is also possible to provide the linear guide device.

A fifteenth aspect of the invention provides a linear guide device in which a rolling element accommodating belt for accommodating a plurality of rolling elements, which are incorporated between a guide rail and a slider, is composed of a larger number of spacer members arranged between the rolling elements and a connecting member for connecting these spacer members in a row, characterized in that the following expression is established.

$$R_p \cdot \sin(tw/2R_b) - R_w \geqq b0$$

where $R_w$ is a radius of the rolling element, $R_b$ is a radius of curvature of the connecting member at the time when the connecting member is elastically deformed into an arcuate shape in a direction change passage in which the direction of the rolling element is changed, $R_p$ is a radius of the central track of the rolling element moving in the direction change passage, tw is a distance between the centers of the spacer members at the time when the connecting member is not elastically deformed, b0 is ½ of the maximum thickness between the rolling element contact faces formed on both end faces of the spacer member.

A sixteenth aspect of the invention provides a rolling element accommodating belt for a linear guide device used for accommodating rolling elements of the linear guide device, composed of a larger number of spacer members arranged between the rolling elements and a connecting member for connecting these spacer members in a row, characterized in that the following expression is established.

$$R_p \cdot \sin(tw/2R_b) - R_w \geqq b0$$

where $R_w$ is a radius of the rolling element, $R_b$ is a radius of curvature of the connecting member at the time when the connecting member is elastically deformed into an arcuate shape in a direction change passage in which the direction of the rolling element is changed, $R_p$ is a radius of the central track of the rolling element moving in the direction change passage, tw is a distance between the centers of the spacer members at the time when the connecting member is not elastically deformed, b0 is ½ of the maximum thickness between the rolling element contact faces formed on both end faces of the spacer member.

A seventeenth aspect of the invention provides a linear guide device in which a rolling element accommodating belt for accommodating a plurality of rolling elements, which are incorporated between a guide rail and a slider, is composed of a larger number of spacer members arranged between the rolling elements and a connecting member for connecting these spacer members in a row, characterized in that: when the connecting member is elastically deformed into a substantial arc in a direction change passage in which the direction of the rolling element is changed, clearance is formed between one rolling element located in the direction change passage and at least one of the spacer members arranged on both sides of the rolling element.

According to the present invention, even when a connecting member of a rolling element accommodating belt is elastically deformed into an arcuate shape in a direction change passage of an end cap, it is possible to prevent a spacer member of the rolling element accommodating belt from interfering with a rolling element on the inner circumferential side of the direction change passage. Therefore, it is possible to prevent an excessively strong force from being repeatedly given to the connecting member of the rolling element accommodating belt.

BRIEF DESCRIPTION OF THE DRAWINGS

FIG. 4(a) is a perspective view showing a rolling element accommodating belt.

FIG. 4(*d*) is a sectional view of the rolling element accommodating section in the direction of aligning balls.

FIGS. 9(*b*) and 9(*c*) are views for explaining a rolling element accommodating section (restraint accommodating section A), wherein FIG. 9(*b*) is a partial enlarged view and FIG. 9(*c*) is a sectional view in the direction of aligning balls.

FIGS. 9(*d*) and 9(*e*) are views for explaining a rolling element accommodating section (no-restraint accommodating section B), wherein FIG. 9(*d*) is a partial enlarged perspective view and FIG. 9(*e*) is a sectional view in the direction of aligning balls.

FIGS. 11(*b*), 11(*d*), 11(*f*), 11(*h*) and 11(*j*) are sectional views in the direction of aligning balls of the rolling element accommodating sections respectively shown in FIGS. 11(*a*), 11(*c*), 11(*e*), 11(*g*) and 11(*i*).

FIGS. 12(*b*), 12(*d*), 12(*f*), 12(*h*) and 12(*j*) are sectional views in the direction of aligning balls in the rolling element accommodating section respectively shown in FIGS. 12(*a*), 12(*c*), 12(*e*), 12(*g*) and 12(*i*).

FIG. 15(*a*) is a view for explaining a phase of each rolling element row in the direction of aligning the rolling elements in an infinite circulating passage and is sectional view taken on line A-A of the linear guide shown in FIG. 13.

FIG. 15(*b*) is a view for explaining a phase of each rolling element row in the direction of aligning the rolling elements in an infinite circulating passage and is sectional view taken on line B-B of the linear guide shown in FIG. 13.

DETAILED DESCRIPTION OF THE INVENTION

Explanations will be made into embodiments of the rolling element accommodating belt for a linear guide device of the present invention, and the linear guide device into which the rolling element accommodating belt is incorporated. Hereinafter, in the linear guide device of the present invention, the similar members or portions to above-mentioned related-art linear guide device will be explained with the same reference numbers.

Figure 1:
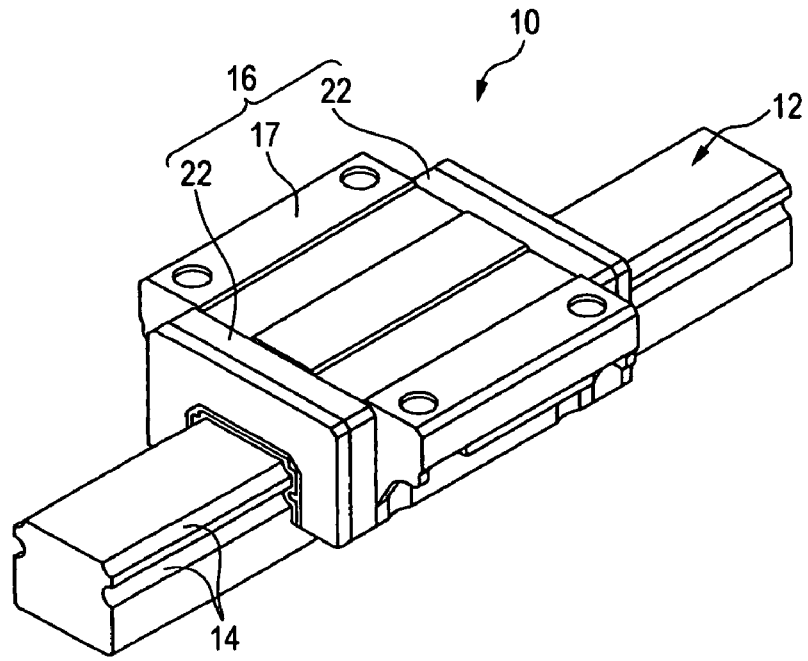
FIG. 1 is a perspective view showing a linear guide relating to the first embodiment of the linear guide device into which the rolling element accommodating belt of the present invention is incorporated.
Figure 2:
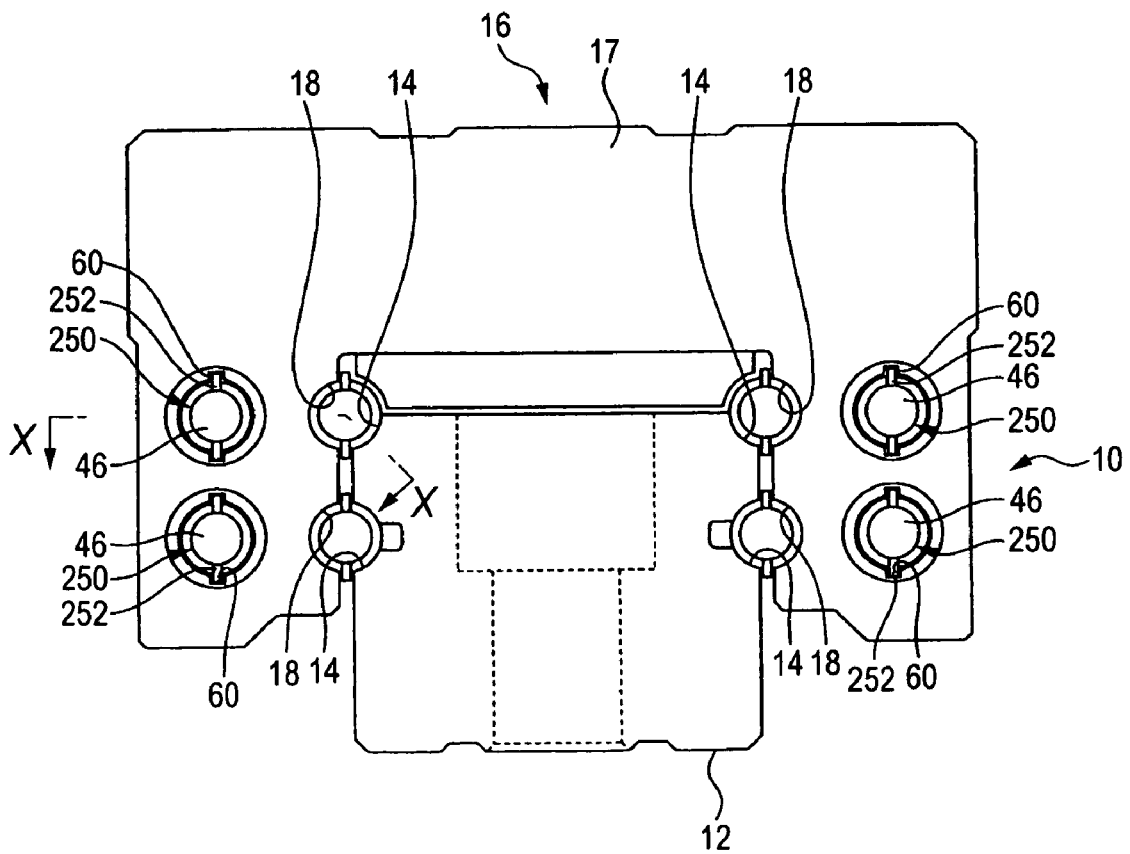
FIG. 2 is a front view of the linear guide shown in FIG. 1, wherein an end cap is removed from the linear guide.
Figure 3:
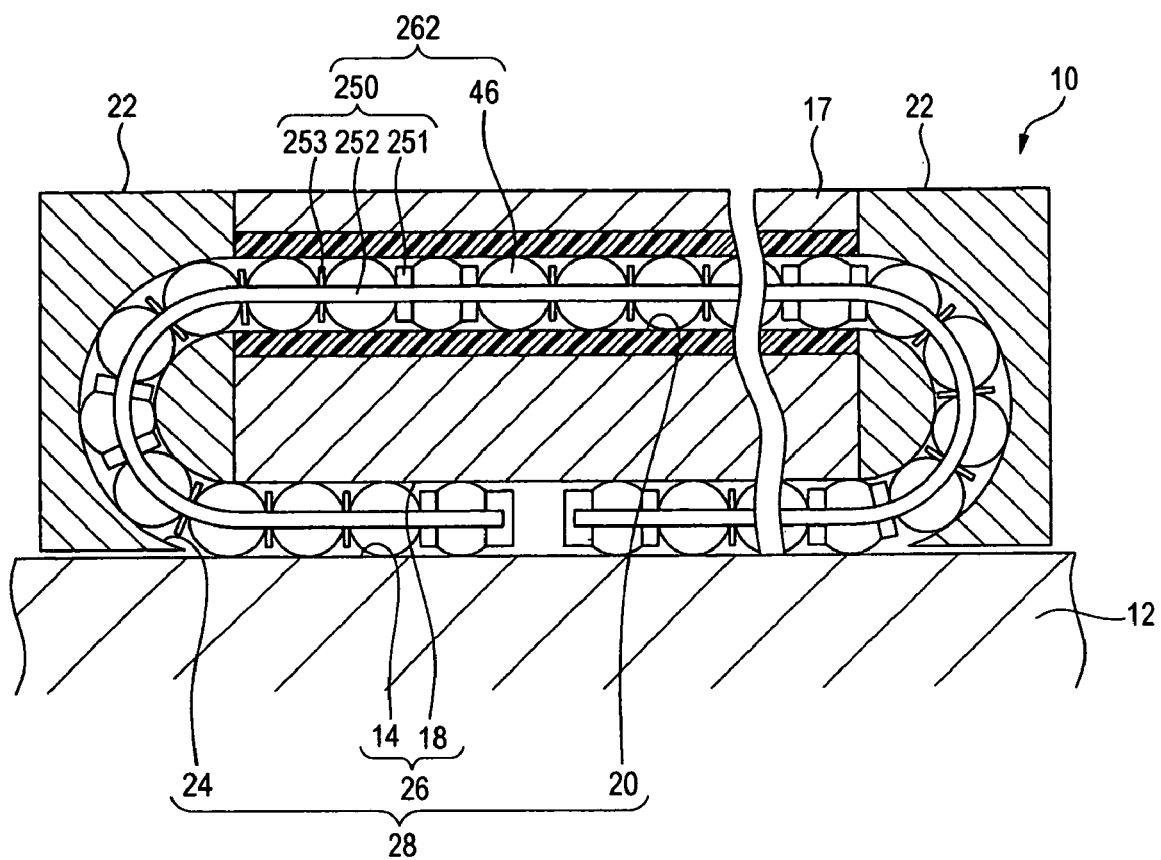
FIG. 3 is a sectional view of the linear guide taken on line X-X in FIG. 2.

FIG. 1 is a perspective view showing a linear guide relating to the first embodiment of the linear guide device into which the rolling element accommodating belt of the present invention is incorporated. FIG. 2 is a front view of the linear guide shown in FIG. 1, wherein an end cap is removed from the linear guide. FIG. 3 is a sectional view of the linear guide taken on line X-X in FIG. 2.

As shown in FIGS. 1 and 2, this linear guide 10 includes: a guide rail 12 having a rolling element guide face 14; and a slider 16 slidably arranged on the guide rail 12 being capable of moving relatively with respect to the guide rail 12.

The guide rail 12 has a substantially square cross section, and two linear rolling element guide faces 14 are formed on each side of the guide rail 12 in the longitudinal direction, that is, in total, four linear rolling element guide faces 14 are formed on both sides of the guide rail 12 in the longitudinal direction.

As shown in FIG. 1, the slider 16 includes: a slider body 17; and a pair of end caps 22, which are lid members and attached to both end portions in the axial direction of the slider body 17. Cross sections of the slider body 17 and the end cap 22 in the axial direction are continuously formed into a substantial C-shape.

As shown in FIG. 2, in total, four load rolling element guide faces 18, the cross sections of which are substantially semi-circular, which are respectively opposed to the rolling element guide faces 14 of the guide rail 12, are formed inside of both wing portions of the slider body 17, the shape of which is a substantial C-shape. As shown in FIG. 3, in the end caps 22, a pair of the direction change passages 24, which continue to both end portions of the load rolling element guide face 18, are formed. As shown in FIGS. 2 and 3, in the slider body 17, the rolling element return passage 20, which is a circular through-hole and communicated with a pair of the direction change passages 24 and formed in parallel with the load rolling element guide face 18, is formed in the wing portion.

As shown in FIG. 3, a space interposed between the rolling element guide face 14 of the guide rail 12 and the load rolling element guide face 18 of the slider 17, which is opposed to the rolling element guide face 14, composes the rolling element track passage 26. A pair of the direction change passages 24, the rolling element return passage 20 and the rolling element track passage 26 compose the infinite circulating passage 28 which annularly continues. In total, four infinite circulating passages 28 are formed.

Further, as shown in FIG. 3, a plurality of balls 46, which are the rolling elements, are charged into each infinite circulating passage 28. The plurality of balls 46 provided in each infinite circulating passage 28 compose a row of the rolling elements 262 together with the rolling element accommodating belt 250.

The rolling element accommodating belt 250 includes: two types spacer members 251, 253 which are interposed between the adjoining balls 46 in the infinite circulating passage 28; and a belt-shaped connecting member 252 for connecting the spacer members 251, 253 with each other on both sides in the width direction of the infinite circulating passage 28. The rolling element accommodating belt 250 is composed as follows. In a plurality of rolling element accommodating sections (described later) which are defined by the spacer members 251, 253 and the connecting member 252, the balls 46 are individually accommodated at predetermined intervals and aligned into a row of the rolling elements 262 in the infinite circulating passage 28 and maintained so that the balls 46 can be rolled. In this connection, as shown in FIG. 2, the rolling element accommodating belt 250 can be guided in such a manner that the connecting member 252 protruding in the width direction in the infinite circulating passage 28 is guided by both sides in the width direction of the groove-shaped guide portion 60 formed in the infinite circulating passage 28 in the slider 16.

Next, the rolling element accommodating belt 250 will be explained in more detail as follows.

Figure 4:
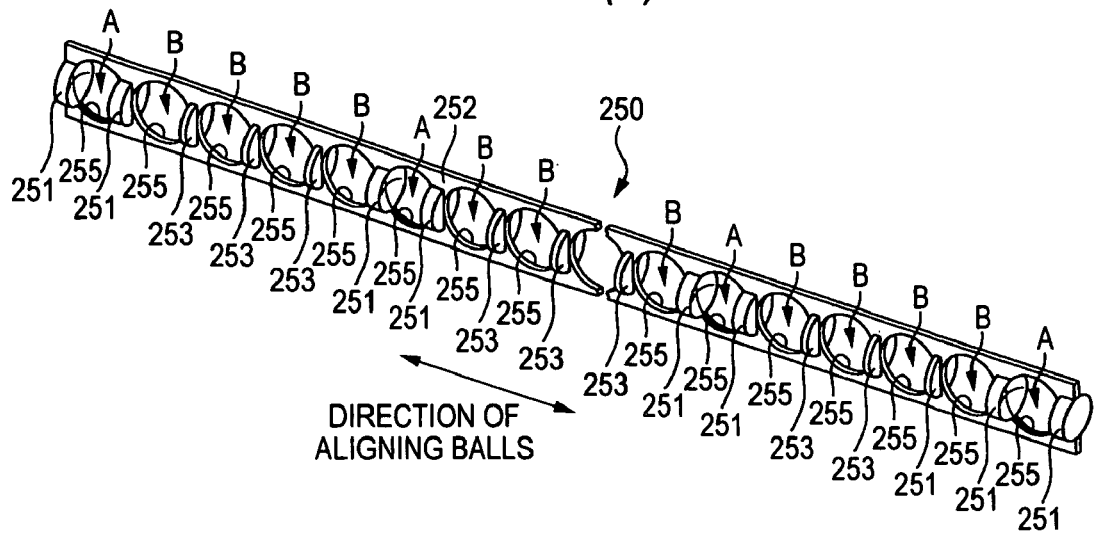
FIGS. 4(*b*) and 4(*c*) are partial enlarged view of FIG. 4(*a*) for explaining a rolling element accommodating section.
Figure 4:
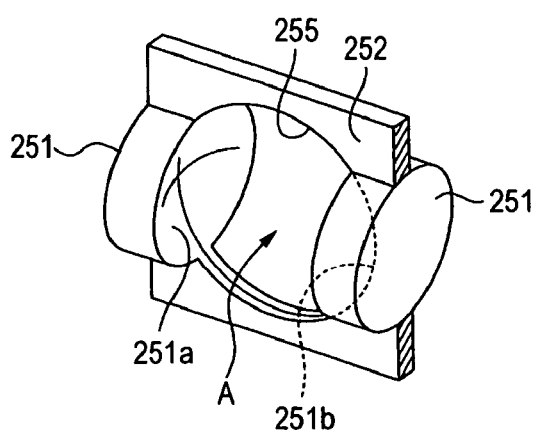
Figure 4:
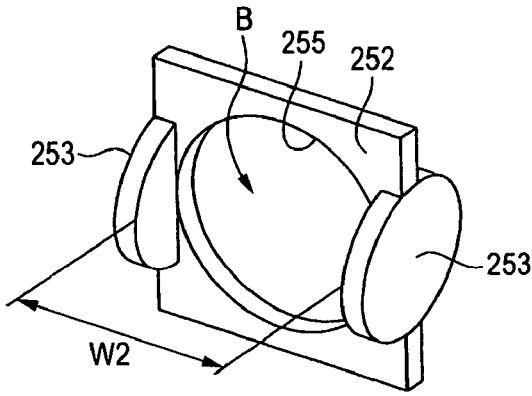
Figure 4:
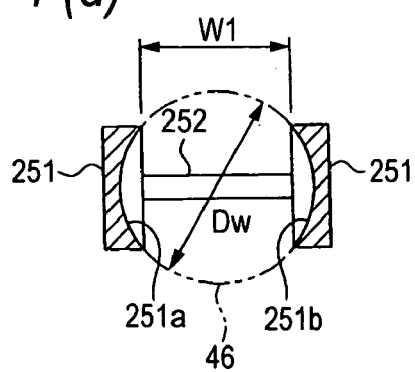

FIG. 4 is a view for explaining the rolling element accommodating belt. FIG. 4(*a*) is a perspective view showing a state in which the rolling element accommodating belt is developed and extended. FIGS. 4(*b*) and 4(*c*) are partial enlarged views of FIG. 4(*a*) for explaining a rolling element accommodating section. FIG. 4(*d*) is a sectional view of the rolling element accommodating section shown in FIG. 4(*b*), wherein this view is taken in the direction of aligning the balls.

As shown in FIG. 4(*a*), the rolling element accommodating belt 250 is formed having end portions. The above two types of the spacer members 251, 253 and the connecting members 252 are integrally made of flexible resin material.

The connecting member 252 is a thin, long belt-shaped member, and the circular ball accommodating hole 255 for accommodating the ball 46 is formed in the longitudinal direction. The inner diameter of this ball accommodating hole 255 is determined to be a size so that the ball 46 can be freely engaged with and disengaged from the connecting member 252 in the directions of both sides of the connecting members. That is, the connecting member 252 itself does not have a function of restraining the ball 46 so that the ball 46 can not come off. Under the condition that the rolling element accommodating belt 250 is removed from the slider body 17, the ball 46, which is accommodated in the ball accommodating hole 255 of the connecting member 252, comes off from the ball accommodating hole 255.

Two types of the spacer members 251, 253 are disk-shaped members, the outer diameters of which are smaller than the outer diameter of the ball 46. The restraint spacer member 251, which is one of the two types of the spacer members, has a spherical concave face, which follows a curved face of the ball 46 and is directed to the adjacent ball 46, on one face in the direction in which the balls 46 are aligned in a row. The other face of the restraint spacer member 251 is flat. On the other hand, the no-restraint spacer member 253, which is the other of the two types of the spacer members, has two planes which are respectively directed to the direction in which the adjacent balls 46 are aligned in a row. These two type of the spacer members are respectively arranged on both sides of each ball accommodating holes 255 with respect to the connecting member 252 in the direction in which the adjacent balls 46 are aligned in a row. In this way, a plurality of rolling element accommodating sections are composed.

In this case, there are provided two types of rolling element accommodating sections according to the degree of restraining the accommodated ball 46 so that the accommodated ball 46 can not come off from the accommodating section. Specifically, one is the restraint accommodating section A in which the ball 46 accommodated in the ball accommodating hole 255 is restrained in all directions, and the other is the no-restraint accommodating section B in which the ball 46 accommodated in the ball accommodating hole 255 is allowed to come off at least in one direction.

To be specific, as shown in FIG. 4(*b*), two restraint spacer members 251 are arranged with respect to the ball accommodating hole 255 so that the ball 46 can be interposed between the concave faces 251*a*, 251*b* of the restraint spacer members 251 from both sides of the ball 46. In this case, as shown in FIG. 4(*d*), distance W1 between the opposing restraint spacer members 251 is smaller than diameter $D_w$ of the ball 46, and the opening width is smaller than the ball diameter. Due to the above structure, the ball 46 is restrained in all directions by the restraint spacer members 251, which are adjacent to each other, so that the ball 46 can not come off from the restraint accommodating section A.

On the other hand, as shown in FIG. 4(*c*), in the no-restraint accommodating section B, the two no-restraint spacer members 253 are arranged on both sides of the ball 46 with respect to the ball accommodating hole 255. In this case, distance W2 between the no-restraint spacer members 253, which are opposed to each other, is substantially the same as the inner diameter of the ball accommodating hole 255. That is, the opening size of the no-restraint accommodating portion B is larger than the outer diameter of the ball 46. Accordingly, the ball 46 is allowed to come off in the direction of both sides of the belt-shaped connecting member 252. Therefore, the ball 46 can be freely engaged with and disengaged from the accommodating section in the direction of both sides of the connecting member 252 in the no-restraint accommodating section B.

In this connection, in the case of the no-restraint accommodating section B that is arranged adjacent to the restraint accommodating section A, the spacer member on the restraint accommodating section A side becomes the restraint spacer member 251. However, as described before, the restraint spacer member 251 has a concave face only on one face in the direction of aligning the balls 46, and the other face of in the direction of aligning the balls 46 is formed out of the same plane as that of the no-restraint spacer member 253. A distance between the restraint spacer member 251 and the no-restraint spacer member 253, which are opposed to each other on the no-restraint accommodating section B side, is equal to distance W2 described before. Therefore, concerning the no-restraint accommodating section B arranged adjacent to the restraint accommodating section A, the ball 46 is allowed to come off in the same manner as that of the other no-restraint accommodating section B.

Further, the above two types of the rolling element accommodating sections A, B are arranged in a predetermined combination. That is, as shown in FIG. 4(*a*), in this rolling element accommodating belt 250 having end portions, both the end portions are the restraint accommodating sections A described before. The restraint accommodating section A is arranged every five accommodating sections in the direction of aligning the balls 46. Four portions arranged between the restraint accommodating sections A are composed of the no-restraint accommodating sections B.

In this case, concerning the number of the restraint accommodating sections A to be arranged in the direction of aligning the balls 46 in a row, it is preferable that at least one restraint accommodating section A is arranged in the linear portion in the infinite circulating passage 28 at all times. Therefore, in this embodiment, the restraint accommodating section A is arranged every five accommodating sections (i.e., as shown in FIG. 4(*a*), the accommodating sections are arranged in order such as A,B,B,B,B,A,B,B,B,B,A . . . ), and at least one restraint accommodating section A is arranged in the linear section in the infinite circulating passage 28 at all times (shown in FIG. 3).

Next, explanations will be made into an action and operation of the linear guide 10 having the rolling element accommodating belt 250 described above and the linear guide 10 provided with the rolling element accommodating belt 250.

Figure 5:
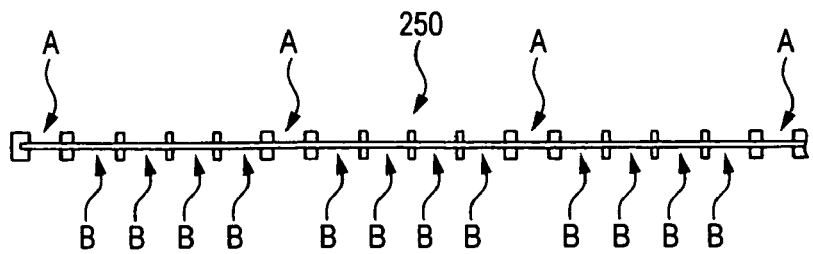
FIG. 5 is a view for explaining an action and effect of the rolling element accommodating belt relating to the present invention.
Figure 5:
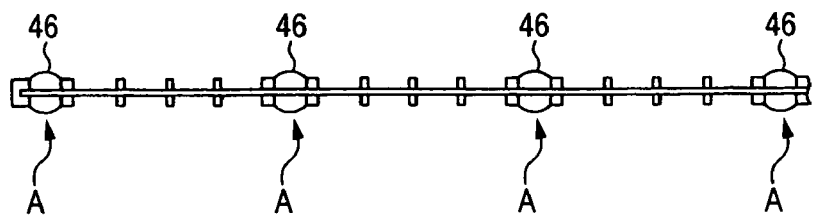
Figure 5:
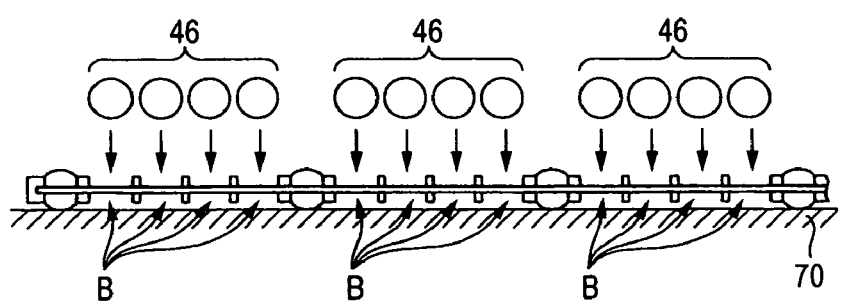
Figure 5:
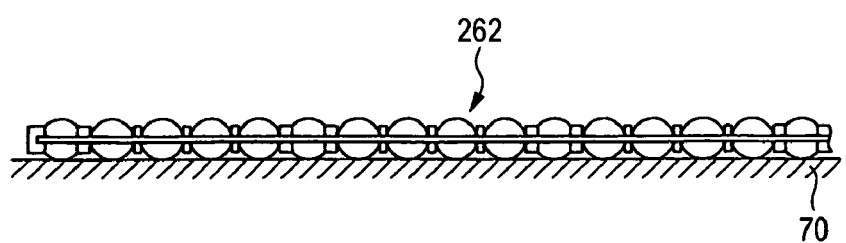
Figure 5:
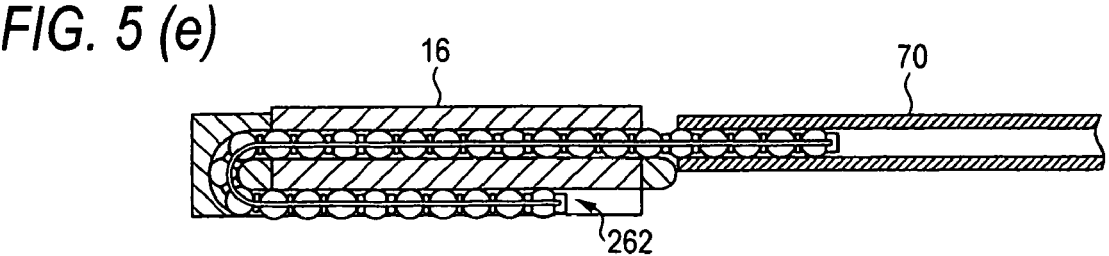

As shown in FIG. 5(*a*), the rolling element accommodating belt 250 is composed as follows. Both end portions of this rolling element accommodating belt 250 are composed of the restraint accommodating sections A as described before, and the restraint accommodating section A is arranged every five accommodating sections. Four accommodating portions arranged between the four restraint accommodating sections A are the no-restraint accommodating sections B.

Therefore, in the case of incorporating the balls 46 into this rolling element accommodating belt 250, as shown in FIG. 5(*b*), first of all, the balls 46 are inserted into only the restraint accommodating sections A. In this case, the same labor as that of the related-art case is needed when the ball 46 is assembled into each restraint accommodating section A. However, since the total number of the restraint accommodating sections A is relatively small, the time required for assembling can be reduced as compared with the related-art rolling element accommodating belt having accommodating sections in which the balls are restrained in all directions.

Figure 6:
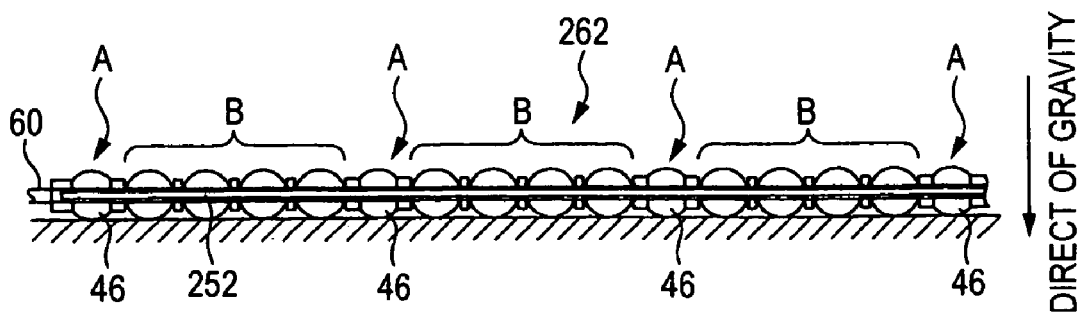
FIG. 6 is a view for explaining an action and effect of the rolling element accommodating belt relating to the present invention.
Figure 6:
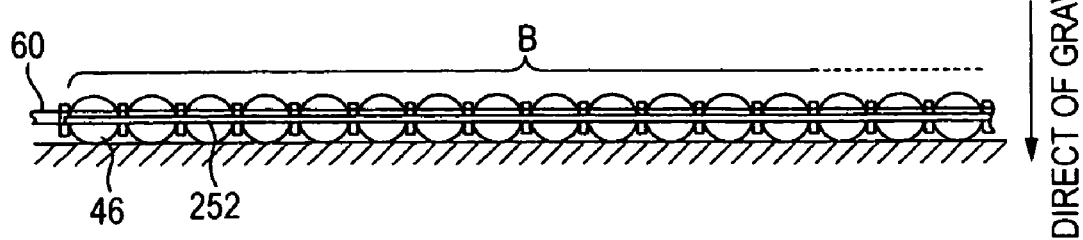

Next, as shown in FIG. 5(*c*), the rolling element accommodating belt 250, in the restraint accommodating sections A of which the balls 46 are attached, is arranged in the assembling jig 70. After that, the balls 46 can be easily inserted into the no-restraint accommodating sections B from the upper portion of the assembling jig 70 as if the balls 46 were made to flow into the no-restraint accommodating sections B. That is, in the no-restraint accommodating sections B, the balls 46 can be easily incorporated into the no-restraint accommodating sections B in the direction in which the balls 46 are allowed to come off. Accordingly, the total time required for assembling is reduced, and as shown in FIG. 5(*d*), it is easy to compose a rolling element row 262, in which the balls 46 are incorporated into the rolling element accommodating belt 250, in the assembling jig 70. As shown in FIG. 5(*e*), the rolling element row 262 can be easily charged into the slider 16 from the assembling jig 70. FIG. 6 is a conceptual view showing a rolling element row circulating in the infinite circulating passage 28. In this connection, FIG. 6(*a*) is a view showing a rolling element row 262 of this embodiment, and FIG. 6(*b*) is a view showing a rolling element row (for example, the rolling element row described in the above Patent Document 4), in which the rolling element accommodating sections are composed of the no-restraint accommodating sections B, of Comparative Example.

In the example shown in FIG. 6, the direction of gravity coincides with the thickness direction of the connecting members 252 of the rolling element accommodating belt 250. Therefore, the connecting members 252 is likely to receive an influence of gravity. In the rolling element row shown in FIG. 6(*b*) in which all the rolling element accommodating sections are composed of the no-restraint accommodating sections B, the connecting members 252 are not restrained in the direction of gravity. Therefore, as shown in FIG. 6(*b*), the connecting members 252 of the rolling element accommodating belt are strongly rubbed with the guide section 60, which is formed in the slider 16 of the linear guide 10, at all times. Accordingly, there is a possibility that the connecting members 252 are worn out.

However, as shown in FIG. 6(*a*), in the rolling element row 262 composed of the rolling element accommodating belt 250 of this embodiment, the restraint accommodating section A can restrain positions of the connecting members 252 in the direction of gravity by the balls 46. That is, in the infinite circulating passage 28, the balls 46 in the restraint accommodating sections A function as a guide of the rolling element accommodating belt 250. Therefore, the connecting member 252 is seldom affected by gravity. Accordingly, there is no possibility that only the connecting members 252 are strongly rubbed with the guide sections 60 formed in the slider 16 of the linear guide 10.

Figure 7:
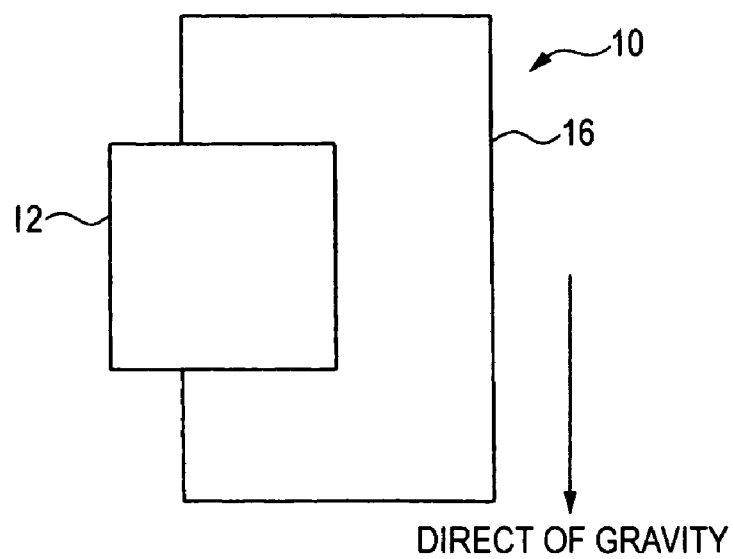
FIG. 7 is a view for explaining an action and effect of the rolling element accommodating belt relating to the present invention.
Figure 8:
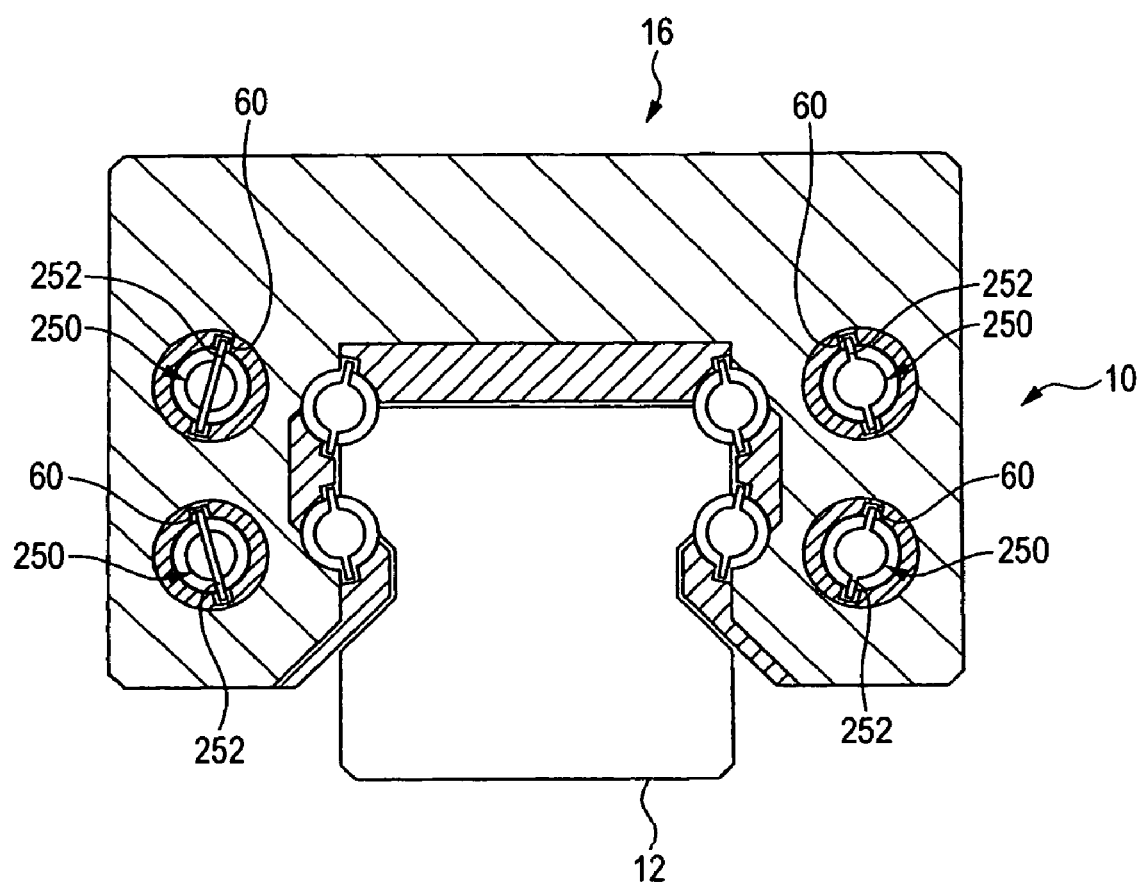
FIG. 8 is a view for explaining an action and effect of the rolling element accommodating belt relating to the present invention.

Therefore, according to the rolling element accommodating belt 250 of this embodiment, the degree of designing can be extended when the posture of using the linear guide 10 and the posture of assembling the rolling element accommodating belt 250 in the linear guide 10 are designed. For example, as shown in the conceptual view of FIG. 7 in which an example of the use is shown, even when the linear guide 10 is used while the slider 16 is being directed in the longitudinal direction, it is possible to conduct designing without especially giving consideration to a state of contact of the guide portion 60 with the connecting member 252. As a variation of the linear guide 10 is shown in FIG. 8, even when designing is conducted in such a manner that the thickness direction of the connecting member 252 is inclined with respect to the horizontal face, it is unnecessary to give special consideration to a state of contact of the guide portion 60 with the connecting member 252. In this connection, the reason why the thickness direction of the connecting member 252 is inclined with respect to the horizontal face is that a distance from the center of the rolling element track passage 26 to the center of the rolling element return passage 20 can be extended. When this distance is extended, a radius of changing the direction in the direction change passage 24 can be extended, and the direction of the ball 46 can be more smoothly changed.

This rolling element accommodating belt 250 is formed being provided with end portions. The rolling element accommodating sections located at both end portions are the restraint accommodating sections A. According to the above structure, a forward end portion of the rolling element accommodating belt 250 (rolling element row 262) can be guided by the balls 46. Accordingly, there is no possibility that the forward end portion of the rolling element accommodating belt 250 is deflected and blocked when it proceeds. Accordingly, a row of the entire rolling elements 262 formed by the rolling element accommodating belt 250 can be more smoothly guided.

The rolling element accommodating belt 250 is composed in such a manner that the restraint accommodating section A is arranged every five accommodating sections, that is, four no-restraint accommodating sections B are arranged between the restraint accommodating sections A. Therefore, the number of the no-restraint accommodating sections B is larger than the number of the restraint accommodating sections A. Due to this structure, labor needed for assembling the balls 46 into the restraint accommodating sections A can be reduced.

This rolling element accommodating belt 250 is composed in such a manner that at least one restraint accommodating section A is located in the linear portion in the infinite circulating passage 28 at all times. Due to this structure, in the linear portion in the infinite circulating passage 28, the rolling element accommodating belt 250 is guided not only by the connecting members 252 but also by the balls 46 of the restraint accommodating sections A at all times. Therefore, the connecting members 252 can be prevented from wearing, and it becomes possible to provide a more reliable linear guide 10.

Next, the second embodiment of the liner guide device of the present invention will be explained below. In this connection, this second embodiment is different from the first embodiment explained above at the point of the structure of the rolling element accommodating belt, and the other points of the structure are the same. Therefore, only the rolling element accommodating belt will be explained here and the other explanations are omitted here.

Figure 9:
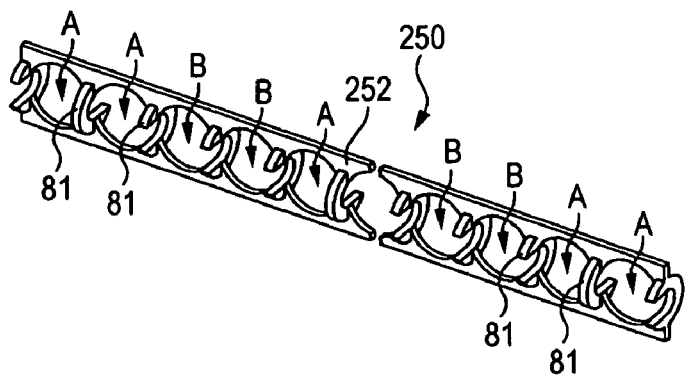
FIG. 9(*a*) is a perspective view showing a rolling element accommodating belt of the second embodiment of the present invention.
Figure 9:
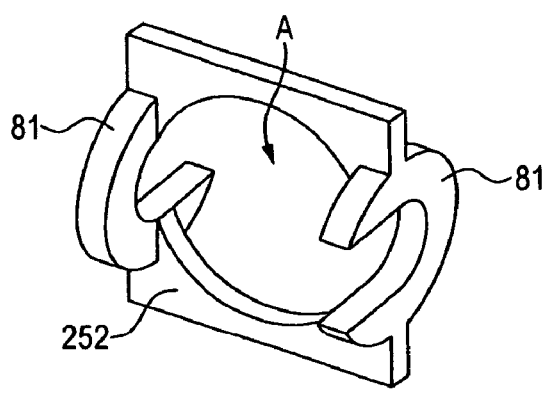
Figure 9:
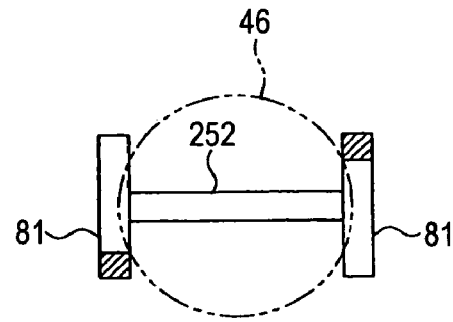
Figure 9:
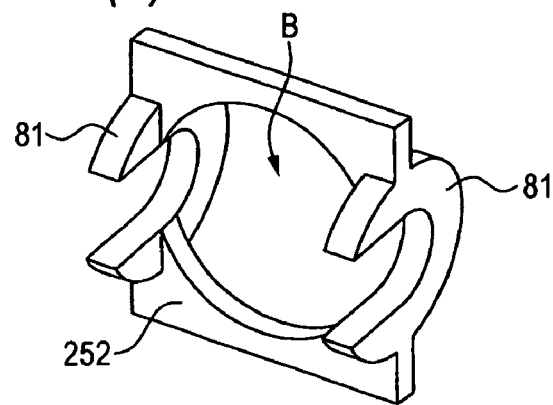
Figure 9:
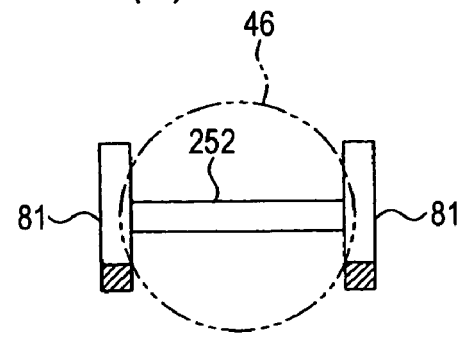

As shown in FIG. 9, the rolling element accommodating belt 80 of the second embodiment is different from that of the first embodiment explained above at the following points of the structure. Instead of the two types of the spacer members including the restraint spacer member 251 and the no-restraint spacer member 253, the rolling element accommodating belt 80 of the second embodiment adopts one type spacer member of the substantially U-shaped spacer member 81.

This spacer member 81 is composed in such a manner that faces of the spacer member 81 directed to the direction of aligning the balls 46 are respectively formed to be a disk-shaped plane, the outer diameter of which is smaller than the outer diameter of the ball 46. The spacer member 81 has a substantially U-shaped opening portion which opens from the center of the disk-shaped plane to one of the directions of both sides of the connecting member 252.

In this rolling element accommodating belt 80, as shown in FIGS. 9(a) and 9(b), the restraint accommodating section A is composed in such a manner that the substantially U-shaped opening portions of the spacer members 81, which are opposed to each other, are directed to the opposite directions to each other. In this structure, the accommodated ball 46 is held by the inside edges of the spacer members 81 which are opposed to each other. Therefore, the ball 46 is not moved in the direction of the row of the balls. Accordingly, the ball 46 is restrained so that it can not come off from the restraint accommodating section A.

As shown in FIGS. 9(d) and 9(e), the no-restraint accommodating section B is composed in such a manner that the directions of the substantially U-shaped opening portions of the spacer members 81 are set to be the same with each other. Therefore, the ball 46 is allowed to come off on the opening side of the substantially U-shaped opening portions of the spacer members 81. Especially in the rolling element accommodating belt 80 of this second embodiment, the azimuth, in which the ball 46 is allowed to come off, is set only on the opening side in the developed shape, that is, the azimuth, in which the ball 46 is allowed to come off, is set only in the same azimuth.

Concerning the arrangement of the restraint accommodating section A and the no-restraint accommodating section B, both end portions of the rolling element accommodating belt 80 are composed of the restraint accommodating sections A in the same manner as that of the first embodiment described before. As shown in FIG. 9(a), concerning the arrangement in the direction of aligning the balls 46, two restraint accommodating sections A are respectively, alternately arranged. Accordingly, in the entire rolling element accommodating belt 80, the number of the restraint accommodating sections A and that of the no-restraint accommodating sections B are approximately the same with each other.

Figure 10:
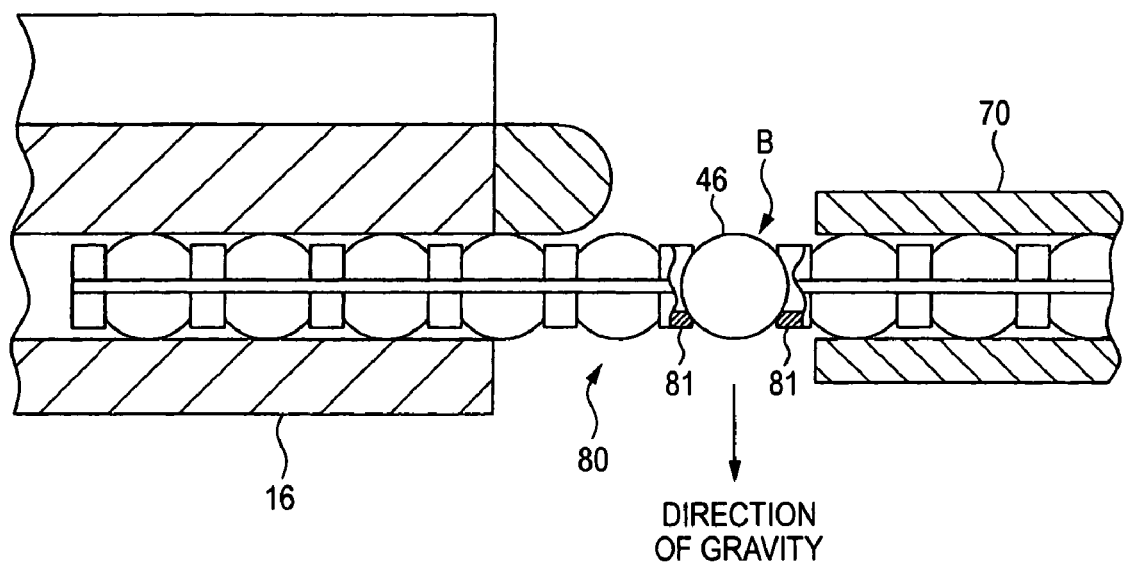
FIG. 10 is a view for explaining an action and effect of the rolling element accommodating belt relating to the present invention.

According to the above constitution, it is possible to provide the same action and effect as those of the first embodiment described before, and further the no-restraint accommodating section B restrains the ball 46 except for the substantially U-shaped opening side so that the ball 46 can not come off. Accordingly, as shown in FIG. 10, when the opening side of the no-restraint accommodating section B is set upward at the time of assembling, even if an interval is formed between the slider 16 and the assembling jig 70, it is possible to prevent the ball 46 from falling off. Therefore, it becomes unnecessary to highly accurately position the slider 16 and the assembling jig 70, and the assembling work can be made easy.

Further, in this second embodiment, faces of the spacer member 81, which are directed in the direction of aligning the balls 46, are flat. Accordingly, the restraint accommodating section A and the no-restraint accommodating section B can be formed in the direction of both sides of the connecting member 252 while the shapes of the restraint accommodating section A and the no-restraint accommodating section B are being formed without under-cut. Consequently, the rolling element accommodating belt 80 can be easily released from a metallic mold at the time of molding.

As explained above, according to the rolling element accommodating belt for a linear guide device of the present invention and also according to the linear guide device having the rolling element accommodating belt, it is possible to provide a rolling element accommodating belt for a linear guide device in which the rolling elements can be easily incorporated into the rolling element accommodating belt, and the connecting member of the rolling element accommodating belt can be prevented from wearing. It is also possible to provide a linear guide device having the rolling element accommodating belt.

In this connection, the rolling element accommodating belt for a linear guide device of the present invention and the linear guide device having the rolling element accommodating belt are not limited to the above specific embodiments. Variations may be made by those skilled in the art without departing from the sprit and scope of the present invention.

For example, in each embodiment described above, explanations are made into an example in which the rolling element accommodating belt for a linear guide device of the present invention is applied to the linear guide 10 having the balls 46 which are used as rolling elements. However, the present invention is not limited to this specific embodiment. The linear guide device can be applied to a roller guide having rollers which are used as rolling elements.

In each embodiment described above, explanations are made into an example in which two types of rolling element accommodating portions are provided, the degrees of restraining the rolling elements from coming off of which are different from each other. However, the present invention is not limited to this specific embodiment. At least two types of rolling element accommodating portions may be provided, the degrees of restraining the rolling elements from coming off of which are different from each other. Therefore, for example, the above plurality of rolling element accommodating sections may be composed of three types of the rolling element accommodating sections. However, in order to make the management easy, it is preferable that two types of the rolling element accommodating sections are provided as described in each embodiment described above.

Each embodiment described above includes: a restraint accommodating section A in which the ball 46 accommodated in the ball accommodating hole 255 is restrained in all directions so that the ball 46 can not come off; and a no-restraint accommodating section B in which the ball 46 accommodated in the ball accommodating hole 255 is allowed to come off at least in one direction, wherein the restraint accommodating section A and the no-restraint accommodating section B are two types of the rolling element accommodating sections, the degrees of restraining the rolling elements from coming off of which are different from each other. However, the degrees of restraining the rolling elements from coming off are not limited to the above specific embodiment. That is, two types of the rolling element accommodating sections may be composed in such a manner that the degree of restraining the rolling elements from coming off of one type may be lower than the degree of restraining the rolling elements from coming off of the other type. For example, in the above no-restraint accommodating section B, the opening size is larger than the outer diameter of the ball 46, and the ball 46 is allowed to come off in the direction of both sides of the connecting member 252. However, the opening size may be substantially the same as the outer diameter of the ball 46. Even in this structure, it is easy to incorporate the ball 46 into the no-restraint accommodating section B relatively with the restraint accommodating section A.

In each embodiment described above, explanations are made into an example in which both end portions of the rolling element accommodating belt having end portions are the restraint accommodating sections A. However, the present invention is not limited to this specific example. One end portion of the rolling element accommodating belt having end portions may be the restraint accommodating section A. However, in order to smoothly guide the rolling element row in the infinite circulating passage, it is preferable that both end portions of the rolling element accommodating belt are composed of the restraint accommodating sections.

In the above embodiments, in the first embodiment, the restraint accommodating section A is composed of the spacer members 251, which are opposed to each other, having a concave face. In the second embodiment, the restraint accommodating section A is composed in such a manner that the substantially U-shaped spacer members 81 are used and the directions of the substantially U-shaped opening portions of the spacer members 81, which are opposed to each other, are directed being opposite to each other. However, the shape and combination of the spacer member composing the restraint accommodating section are not limited to each embodiment described above. In the embodiments described above, in the first embodiment, the no-restraint accommodating section B is composed of the flat spacer members 253 which are opposed to each other. In the second embodiment, the no-restraint accommodating section B is composed in such a manner that the directions of the substantially U-shaped opening portions of the spacer members 81 are set in the same direction. However, the shape and combination of the spacer member composing the no-restraint accommodating section are not limited to the above specific embodiment.

Figure 11:
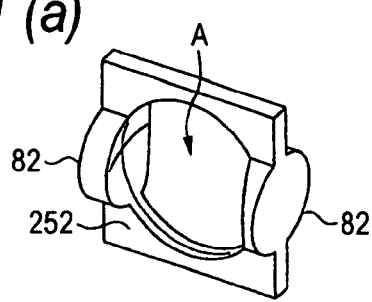
FIGS. 11(*a*), 11(*c*), 11(*e*), 11(*g*) and 11(*i*) are views showing variations of the rolling element accommodating section (restraint accommodating section A) of the rolling element accommodating belt relating to the present invention and are partial enlarged perspective views respectively corresponding to FIG. 4(*b*).
Figure 11:
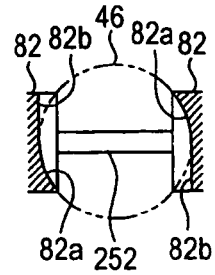
Figure 11:
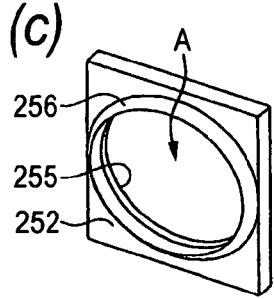
Figure 11:
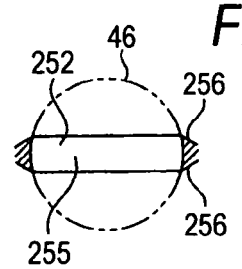
Figure 11:
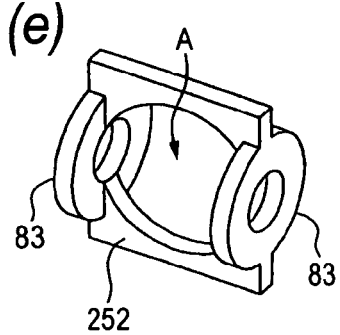
Figure 11:
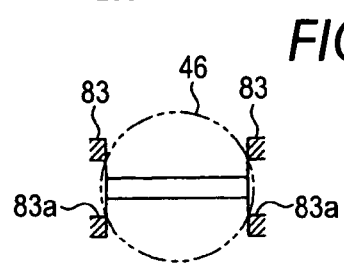
Figure 11:
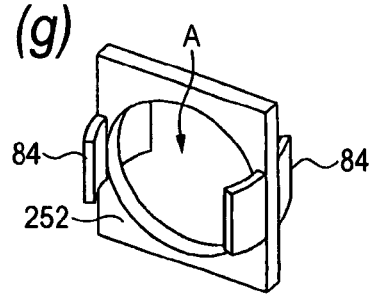
Figure 11:
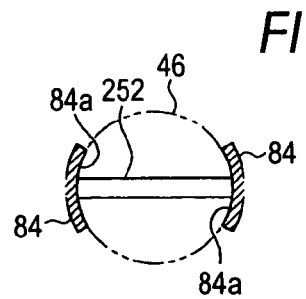
Figure 11:
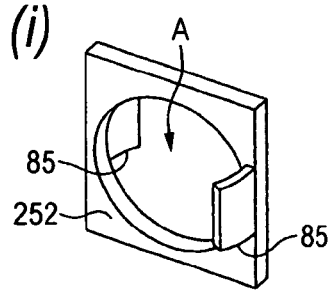
Figure 11:
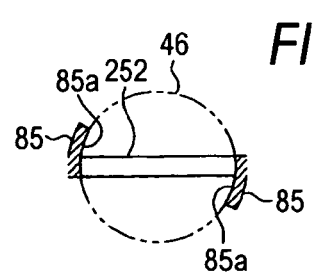

For example, FIG. 11 is a view showing variations of the shape and combination of the spacer member composing the restraint accommodating section A.

In the first variation shown in FIGS. 11(*a*) and 11(*b*), each spacer member 82 is composed of a combination in which the faces of the spacer members 82 formed on the ball 46 side are a spherical face 82*a* and a curved face 82*b*, and the curved face 82*b* side is an opening portion directed to both sides of the connecting member 252. The directions of the opening portions of the spacer members 82, which are opposed to each other, are directed being opposite to each other in the direction of both sides of the connecting member 252. In this way, the restraint accommodating section A is composed.

In the second variation shown in FIGS. 11(*c*) and 11(*d*), no spacer members are used. In each embodiment described above, explanations are made into an example in which the rolling element accommodating section is formed out of a portion defined by the spacer members and the connecting member. However, the present invention is not limited to the above specific example. The rolling element may be formed out of only the ball accommodating hole 255 of the connecting member 252. In this example, the lip portion 256 is provided on the circumferential wall of the ball accommodating hole 255 of the connecting member 252. This lip portion 256 protrudes in the direction of both sides of the connecting member 252. The inner face of this lip portion 256 is formed while following the spherical face of the ball 46, so that the inner face of this lip portion 256 can allow the ball 46 to rotate. This lip portion 256 has a concave face capable of restraining the ball 46 so that the ball 46 can not come off. This ball accommodating hole 255 and the lip portion 256 arranged in the periphery of the ball accommodating hole 255 compose the restraint accommodating portion A.

In the third variation shown in FIGS. 11(*e*) and 11(*f*), the spacer members 83, which are opposed to each other, are respectively composed of an annular flat plate. The restraint accommodating section A is composed of the spacer members 83 in such a manner that a distance between the spacer members 83, which are opposed to each other, is determined to be a value at which the ball 46 can be rotated on the circumferential edge of the through-hole 83*a* penetrating the center of the annular shape and the ball 46 can be restrained so that it can not come off.

In the fourth embodiment shown in FIGS. 11(g) and 11(h), each spacer member 84 is composed of a substantially rectangular pawl portion which protrudes in the direction of both sides of the connecting member 252. This pawl portion is composed of a curved face 84a opposing to the ball accommodating hole 255. The ball 46 is allowed to rotate between the curved faces 84a opposing to each other. Further, these curved faces 84a opposing to each other compose the restraint accommodating portion A capable of restraining the ball 46 so that it can not come off.

In the fifth variation shown in FIGS. 11(i) and 11(j), the spacer member 85 is composed of one pawl portion, the shape of which is a substantial rectangle, protruding to one side of the direction of both sides of the connecting member 252 and also composed of the other pawl portion, the shape of which is a substantial rectangle, protruding to the opposite side of the pawl portion. Each pawl portion has a curved face 85a directed to the ball accommodating hole 255 side. Two curved face 85a are opposed to each other. The curved faces 85a of the pawl portions of the spacer members 85, which are opposed to each other, allow the ball 46 to rotate and restrain the ball 46 from coming off. In this way, the restraint accommodating portion A is composed.

Figure 12:
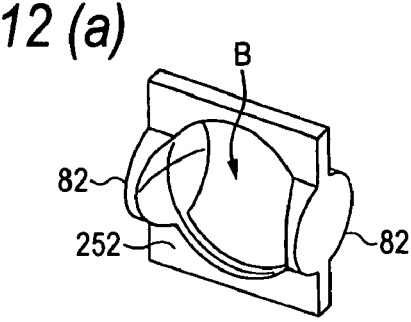
FIGS. 12(*a*), 12(*c*), 12(*e*), 12(*g*) and 12(*i*) are views showing variations of the rolling element accommodating section (no-restraint accommodating section B) of the rolling element accommodating belt relating to the present invention and are partial enlarged perspective views respectively corresponding to FIG. 4(*c*).
Figure 12:
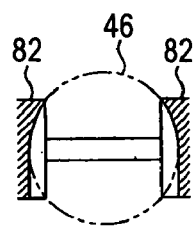
Figure 12:
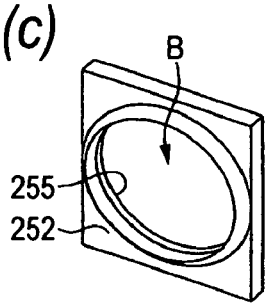
Figure 12:
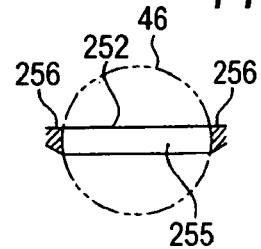
Figure 12:
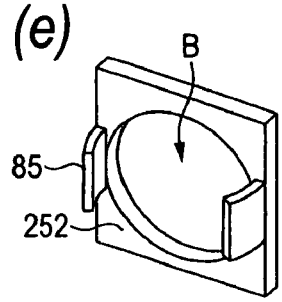
Figure 12:
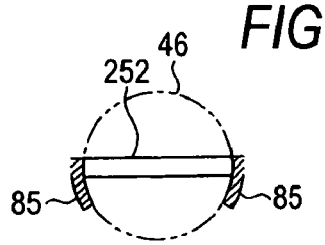
Figure 12:
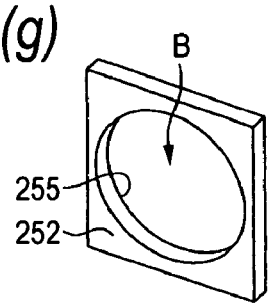
Figure 12:
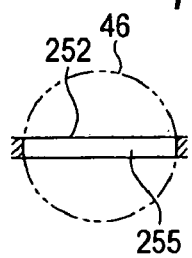
Figure 12:
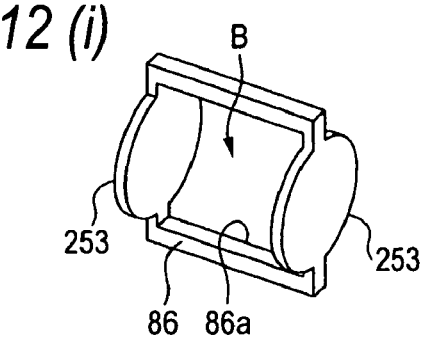
Figure 12:
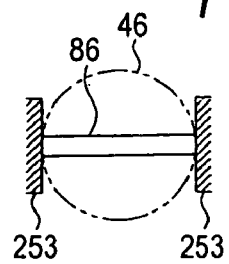

FIG. 12 is a view showing variations of the shape and combination of the spacer member composing the no-restraint accommodating portion B.

In the sixth variation shown in FIGS. 12(a) and 12(b), the shape of the spacer member 82 is the same as that of the first variation shown in FIGS. 11(a) and 11(b). When the directions of the opening portions of the spacer members, which are opposed to each other, are directed to the same direction with respect to the direction of both sides of the connecting member 252, no-restraint accommodating section B is composed. In this connection, in the no-restraint accommodating section B of this example, the azimuth, in which the ball 46 is allowed to come off, is only one of the directions of both sides of the connecting member 252 in the same manner as that of the second embodiment described before.

In the seventh variation shown in FIGS. 12(c) and 12(d), no spacer members are used. In this example, in the same manner as that of the second variation shown in FIGS. 11(c) and 11(d), on the circumferential wall of the ball accommodating hole 255 of the connecting member, the lip portion 256 is provided which has a concave face formed while following the spherical face of the ball 46. This lip portion 256 is formed only on one side of the directions of both sides of the connecting member 252. The other side of the directions of both sides of the connecting member 252 is open so that it can be larger than the diameter of the ball 46. Therefore, the lip portion 256 of this ball accommodating hole 255 composes the no-restraint accommodating section B to allow the ball 46 to come off on the other side of the directions of both sides of the connecting member 252.

In the eighth variation shown in FIGS. 12(e) and 12(f), the spacer member 85 is provided which is formed in the same manner as that of the pawl portion of the fifth variation shown in FIGS. 11(i) and 11(j). In this example, the pawl portions are protruded to one side (the same side) of the directions of both sides of the connecting member 252. Therefore, the spacer members 85 of this example compose the no-restraint accommodating section B to allow the ball 46 to come off on the other side of the directions of both sides of the connecting member 252.

In the ninth variation shown in FIGS. 12(g) and 12(h), no spacer members are used. In this example, only the ball accommodating hole 255, which is composed in the connecting member 252, composes the no-restraint accommodating section B, and the ball 46 is allowed to come off on both sides of the directions of both sides of the connecting member 252.

In the tenth variation shown in FIGS. 12(i) and 12(j), in the same manner as that of the first embodiment described before, the no-restraint accommodating section B is composed of the flat spacer members 253 opposed to each other. However, in this example, the ball accommodating hole 86a formed in the connecting member 86 is not a circle but a rectangle which allows the ball 46 to pass through in the directions of both sides of the connecting member 86. As described above, concerning the rolling element accommodating section relating to the present invention, the shape of the ball accommodating hole is not limited to a circle. It is possible to adopt various shapes.

Of course, the rolling element accommodating section of the present invention can be composed in such a manner that each embodiment and each variation described above are combined with each other. For example, it is possible to compose a rolling element accommodating belt for a linear guide device having a rolling element accommodating section in which the restraint accommodating section A of the first variation and the no-restraint accommodating section B of the sixth variation are combined with each other.

Next, the third embodiment of the linear guide device of the present invention will be explained below.

In this connection, the structure of the track face and the circulating motion of the rolling elements and the structure of the linear guide device except for the rolling element accommodating belt are the same as those of the first and second embodiments described before. Therefore, only the rolling element accommodating belt will be explained here and the other explanations are omitted here.

Figure 14:
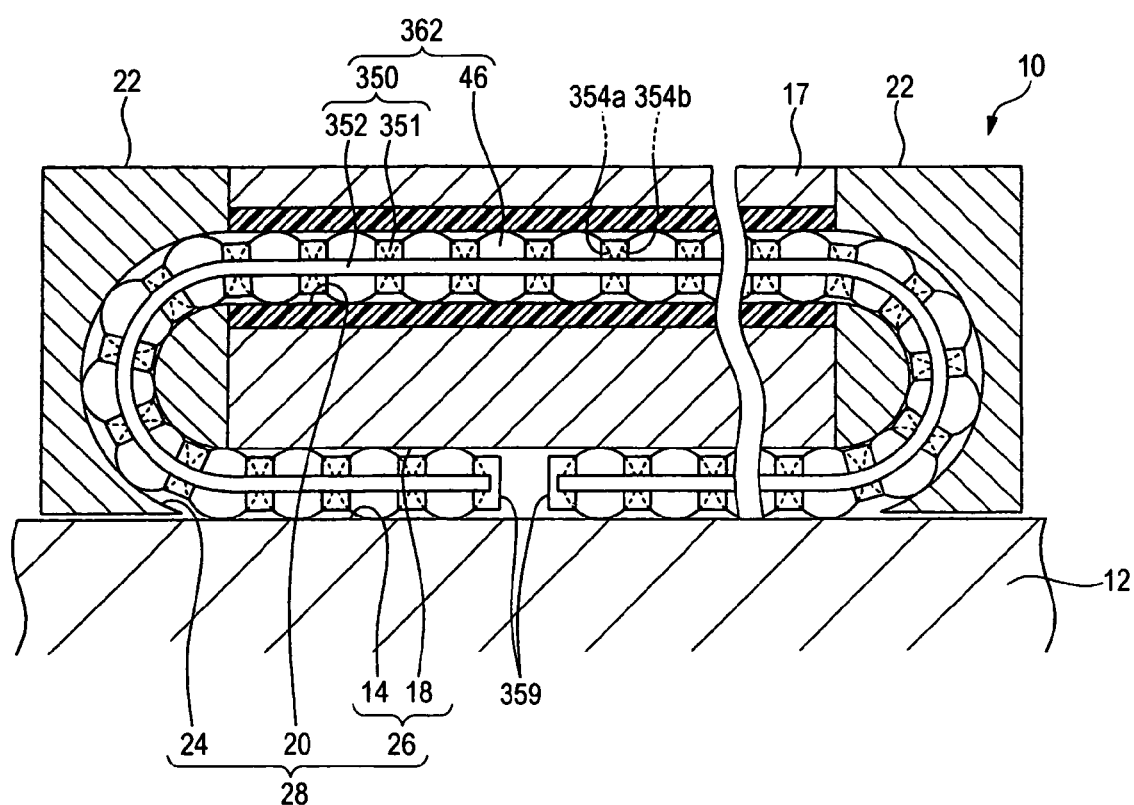
FIG. 14 is a sectional view taken on line X-X in the linear guide shown in FIG. 13.

To be in more detail, the rolling element accommodating belt 350 of the third embodiment is formed out of flexible synthetic resin by means of injection molding. As shown in FIG. 14, the end portions 359 are respectively provided at both end portions of the rolling element accommodating belt 350. These two end portions 359 are opposed to each other in the infinite circulating passage 28 not coming into contact with each other. The rolling element accommodating belt 350 includes: a spacer member 351 interposed between the balls 46, which are adjacent to each other, in the infinite circulating passage 28; and a pair of the belt-shaped connecting members 352 for connecting the spacer members 351 with each other on both sides in the width direction of the infinite circulating passage 28.

The connecting members 352 are long thin belt-shaped members. In these connecting members 352, circular holes for accommodating the balls 46 are formed being aligned in the longitudinal direction. The inner diameter of this ball accommodating hole is determined so that the ball 46 can be freely attached with and detached from the ball accommodating hole in the direction of both sides of the connecting member 352.

The spacer member 351 is a short-columnar member, the outer diameter of which is smaller than the outer diameter of the ball 46. The spacer members 351 include the spherical concave faces 354a, 354b, which follow the curved face of the ball 46 adjacent to the spacer members 351, on both short-columnar end faces, and these the spherical concave faces 354a, 354b are directed in the direction of aligning the balls 46 in the infinite circulating passage 28. The spacer members 351 are arranged on both sides of each ball accommodating hole at predetermined intervals in the direction of aligning the balls 46.

Figure 13:
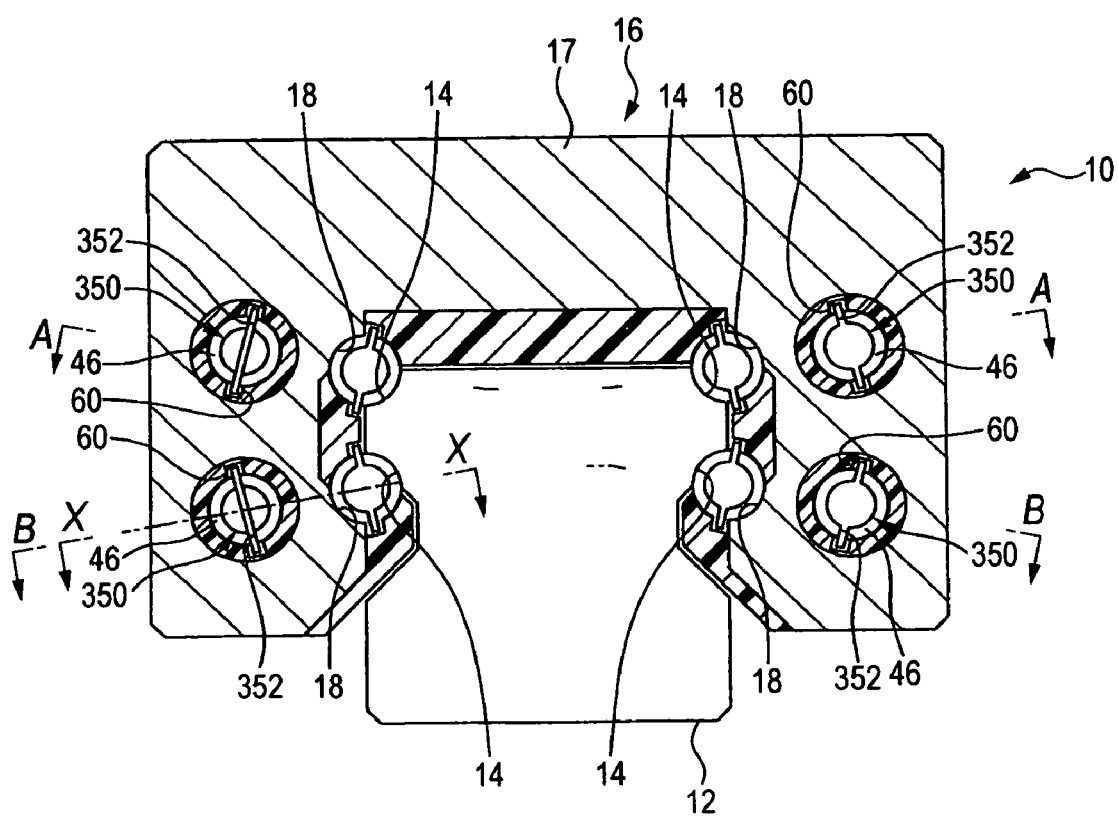
FIG. 13 is a front view showing a state in which an end cap is removed from the linear guide of the third embodiment of the present invention.

Spaces defined by these spacer members 351 and the connecting members 352 are formed into a plurality of the rolling element accommodating sections. In these rolling element accommodating sections, the balls 46 are individually accommodated at predetermined intervals. In this way, the balls 46 are aligned to be a rolling element row 362 in the infinite circulating passage 28 in the direction of aligning the balls 46. In this case, the rolling element accommodating section is composed in such a manner that the accommodated ball 46 is restrained in all azimuths at predetermined intervals and the concave faces 354*a*, 354*b*, which are opposed to each other, so that the accommodated ball 46 can not come off. In this connection, as shown in FIG. 13, the connecting member 352 protruding in the width direction in the infinite circulating passage 28 is guided by the groove-shaped guide section 60, which is formed in the infinite circulating passage 28 in the slider 16, on both sides in the width direction.

In this connection, in this linear guide 10, the numbers of the balls 46 composing the rolling element rows 362 in the infinite circulating passages 28 are the same, and the lengths of the rolling element accommodating belts 350 in the infinite circulating passages 28 are the same.

Further, as shown in FIGS. 15(*a*) and 15(*b*), in this linear guide 10, the phases of the end portions 359 of the rolling element accommodating belt 350 are different from the phases of the end portions 359 of the rolling element accommodating belt 350 in the other infinite circulating passage 28 in the direction of the rolling elements in the infinite circulating passage.

Explanations will be made into the procedure and work of assembling the rolling element rows 362 into the infinite circulating passages 28 in the method of manufacturing this linear guide 10.

Figure 16:
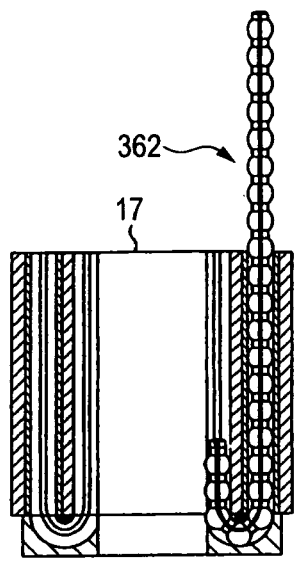
FIG. 16 is a view for explaining a procedure and work of incorporating a rolling element row into each infinite circulating passage in the method of manufacturing a linear guide device of the present invention.
Figure 16:
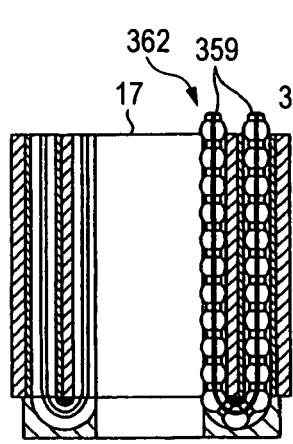
Figure 16:
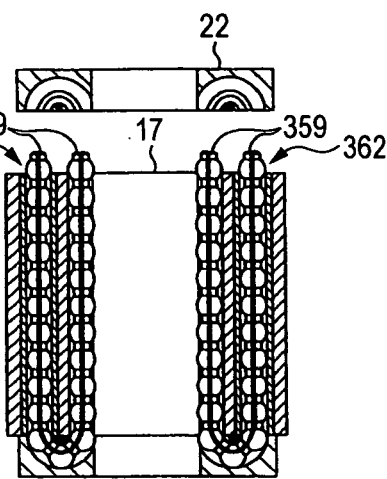
Figure 16:
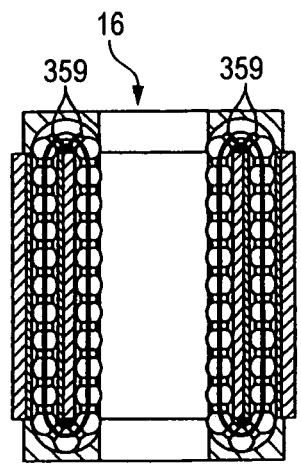
Figure 16:
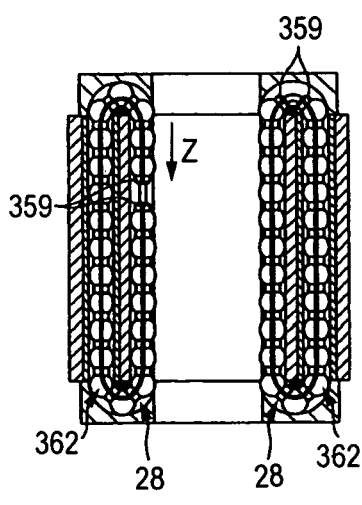
Figure 16:
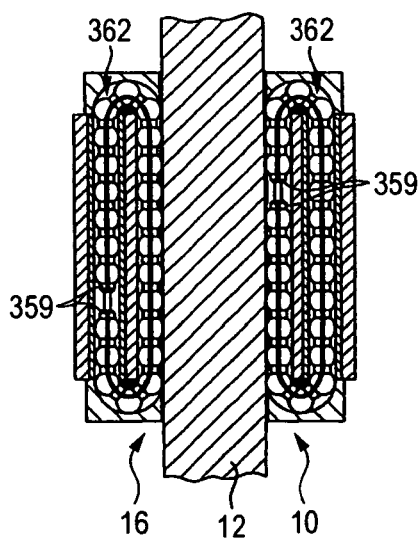

In the method of manufacturing this linear guide 10, first, the rolling element row insertion step is executed as follows. As shown in FIGS. 16(*a*) and 16(*b*), one of the lid members 22 is removed from the slider 16. From the thus opened portion, the rolling element row 362 is inserted into the infinite circulating passage 28. At this time, as shown in FIG. 16(*b*), the rolling element row 362 is inserted into the infinite circulating passage 28 until two end portions 359 are aligned at the opening portion. In the same manner, as shown in FIG. 16(*c*), the rolling element rows 362 are successively incorporated into the infinite circulating passage 28.

Next, after the rolling element row insertion step, as shown in FIG. 16(*d*), the lid member 22, which was removed before, is attached to the slider body 17 (the lid member attaching step).

After the lid member attaching step, as shown in FIG. 16(*e*), a plurality of the rolling element rows 362 in the infinite circulating passages 28 are adjusted so that the phase of the end portion 359 of the rolling element accommodating belt 350 in the direction of aligning the rolling elements can be different from the phase of the end portion 359 of the other rolling element accommodating belt 350 in the direction of aligning the rolling elements (the phase adjustment step). At this time, the phase of the end portion 359 of at least one row of the rolling element accommodating belt 350 is adjusted as follows. When the end portion 359 concerned is located in the rolling element track passage 26, which is a region where the rolling elements are given a load, the end portion 359 of at least one row of the rolling element accommodating belt 350 is moved so that the phase of the end portion 359 of at least one row of the rolling element accommodating belt 350 in the other infinite circulating passage 28 in the direction of aligning the rolling elements can be located in a portion except for the rolling element track passage 26. In this connection, in FIG. 16(*e*), an image of moving the rolling element row 362 so as to adjust the phase of the end portion 359 is expressed by an arrow attached with reference mark Z.

Finally, as shown in FIG. 16(*f*), the slider 16, into which the rolling element rows 362 are incorporated, is attached to the guide rail 12.

Next, the method of manufacturing the above linear guide 10 will be explained below. Further, the action and effect of the linear guide will be explained below.

As described above, the method of manufacturing the linear guide 10 includes a phase adjustment step in the procedure of incorporating the rolling element rows 362 into the infinite circulating passages 28. The rolling element rows 362 are incorporated into the infinite circulating passages 28 in this phase adjustment step so that the positions (the phases in the aligning direction of the rolling elements) of the end portions of the rolling element rows 362 can be different from each other in the infinite circulating passages 28.

As shown in FIGS. 15(*a*) and 15(*b*), in the linear guide 10, the rolling element rows 362 are incorporated into the infinite circulating passages 28 so that the phases of the end portions 359 of the rolling element rows 362, which are formed into four rows, in the direction of aligning the rolling elements can be different from each other. Therefore, the timing, at which the end portion 350 of the rolling element accommodating belt 350 and each portion of the infinite circulating passage 28 interfere with each other, is generated being shifted from each other for each infinite circulating passage 28. That is, there is no possibility that the timing is simultaneously generated all at once. Accordingly, it is possible to suppress an increase in the sliding resistance of the linear guide, and vibration and noise can be reduced at the time of operation.

At this time, the phase of the end portion 359 of at least one row of the rolling element accommodating belt 350 is adjusted as follows. When the end portion 359 concerned is located in the rolling element track passage 26, which is a region where the rolling elements are given a load, the end portion 359 of at least one row of the rolling element accommodating belt 350 is moved so that the phase of the end portion 359 of at least one row of the rolling element accommodating belt 350 in the other infinite circulating passage 28 in the direction of aligning the rolling elements can be located in a portion except for the rolling element track passage 26.

When the phase arrangement is made as described above, there is no possibility that the end portions of all the infinite circulating passages are simultaneously located in the rolling element track passages 26 all together. Therefore, even when a gap is formed between both end portions 359 of each rolling element accommodating belt 350 in the manner of this embodiment, each gap is not simultaneously located in the rolling element track passages 26. Due to the foregoing, even if the gap is existing, there is no possibility that the number of the balls 46 receiving a load is not reduced in the rolling element track passage all at once. Accordingly, it is possible to prevent the occurrence of a sudden change in the sliding resistance of the linear guide 10.

As explained above, according to the method of manufacturing a linear guide device of the present invention and also according to the linear guide device, it is possible to suitably suppress an increase in the sliding resistance of the linear guide device and it is also possible to suitably reduce the generation of vibration and noise at the time of operation.

In this connection, it should be noted that the method of manufacturing a linear guide device of the present invention and the linear guide device are not limited to the above specific embodiment. Variations may be made by those skilled in the art without departing from the spirit and scope of the present invention.

For example, in the third embodiment described above, explanations are made into the linear guide 10 having the balls 46 to be used as rolling elements. However, the present invention is not limited to the above specific embodiment. It is possible to apply the linear guide device to a roller guide having rollers to be used as rolling elements.

In the third embodiment described above, in the rolling element accommodating section, the accommodated ball 46 is restrained in all azimuths so that the ball 46 can not come off. However, the present invention is not limited to the above specific embodiments. For example, the rolling element accommodating belt and the linear guide device may be those of the first and second embodiment described above, more specifically, the rolling element accommodating section may be composed of the restraint accommodating section A and the no-restraint accommodating section B as described in the first and second embodiment described above. Or, the rolling element accommodating section may be composed of only the no-restraint accommodating section B.

In the third embodiment described above, the end portions 359 are opposed to each other not coming into contact with each other. However, the present invention is not limited to the above specific embodiment. For example, the end portions 359 may be connected to each other.

Figure 17:
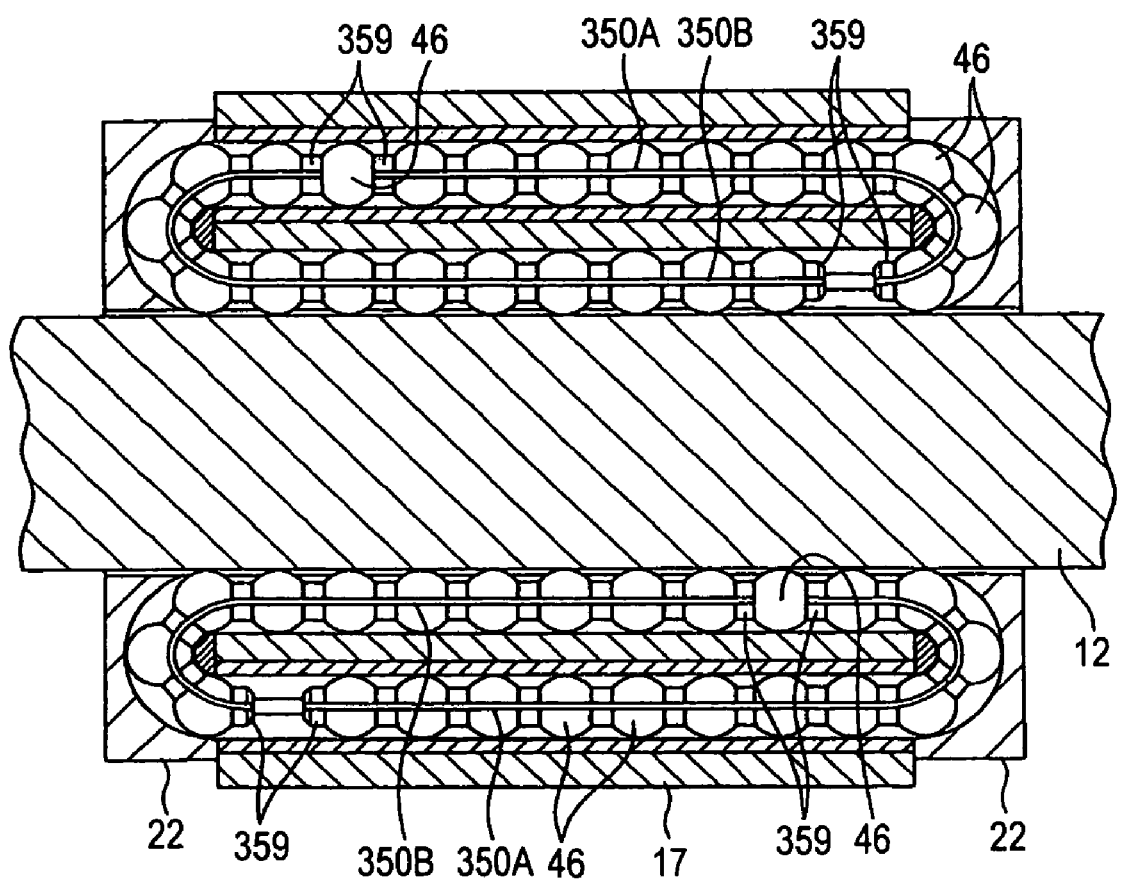
FIG. 17 is a view for explaining a variation of the rolling element row in the infinite circulating passage.

In each embodiment described above, only one rolling element accommodating belt is provided in each of the plurality of the rows of the infinite circulating passage. However, the present invention is not limited to the above specific embodiment. For example, as shown in the variation illustrated in FIG. 17, a plurality of rolling element accommodating belts may be provided in each infinite circulating passage. In this connection, in the example shown in FIG. 17, two rolling element accommodating belts 350A, 350B are provided in the respective infinite circulating passages. Concerning the two sets of the end portions 359, the balls 46 are arranged in one set, and the end portions are opposed to each other not coming into contact with each other in the other set.

Figure 18:
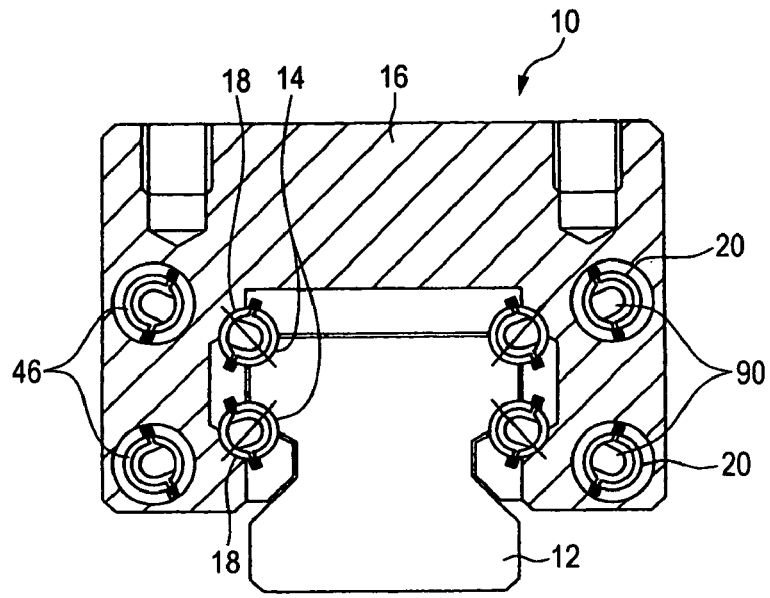
FIG. 18 is a sectional view taken in the width direction of the linear guide of the fourth embodiment of the present invention.
Figure 19:
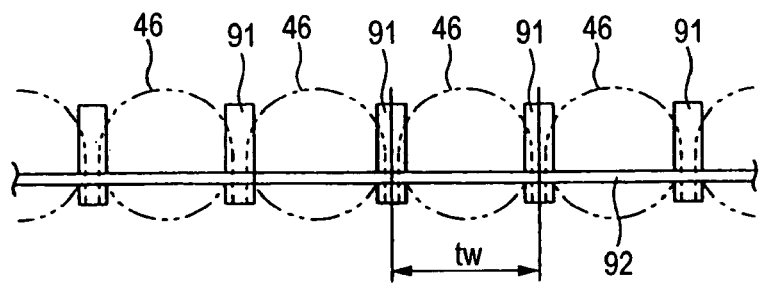
FIG. 19 is a view showing a structure of the rolling element accommodating belt shown in FIG. 18 in detail.
Figure 19:
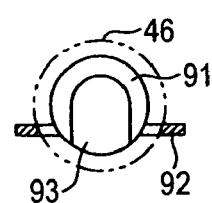
Figure 19:
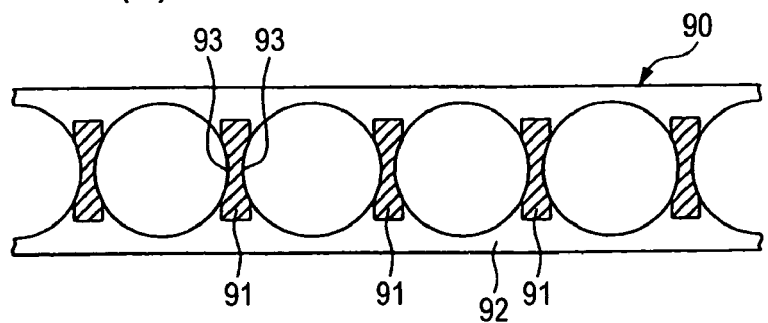

Next, referring to FIGS. 18 to 20, the fourth embodiment of the liner guide device of the present invention will be explained below.

In this connection, the structure of the track face and the circulating motion of the rolling elements and the structure of the linear guide device except for the rolling element accommodating belt are the same as those of the first and second embodiments described before. Therefore, only the rolling element accommodating belt will be explained here and the other explanations are omitted here.

To be in more detail, the rolling element accommodating belt 90 of the forth embodiment (shown in FIG. 18) for accommodating the roller elements 64 is made of resin. As shown in FIG. 19, this rolling element accommodating belt 90 includes: a large number of spacer members 91 provided between the rolling elements 64; and a belt-shaped connecting member 92 for connecting these spacer members 91 in a row at predetermined intervals.

Each spacer member 91 is formed into a disk-shape, the diameter of which is smaller than the diameter of the rolling element 64. On both end faces of the spacer member 91, the rolling element contact faces 93 having a combined face of spherical face and a cylindrical face which slidably comes into contact with the rolling element 64. On the other hand, the width of the connecting member 92 is larger than the diameter of the rolling element 64. This connecting member 92 is elastically deformed into an arcuate shape in the direction change passage 24 of the end cap 22 as shown in FIG. 20.

Figure 20:
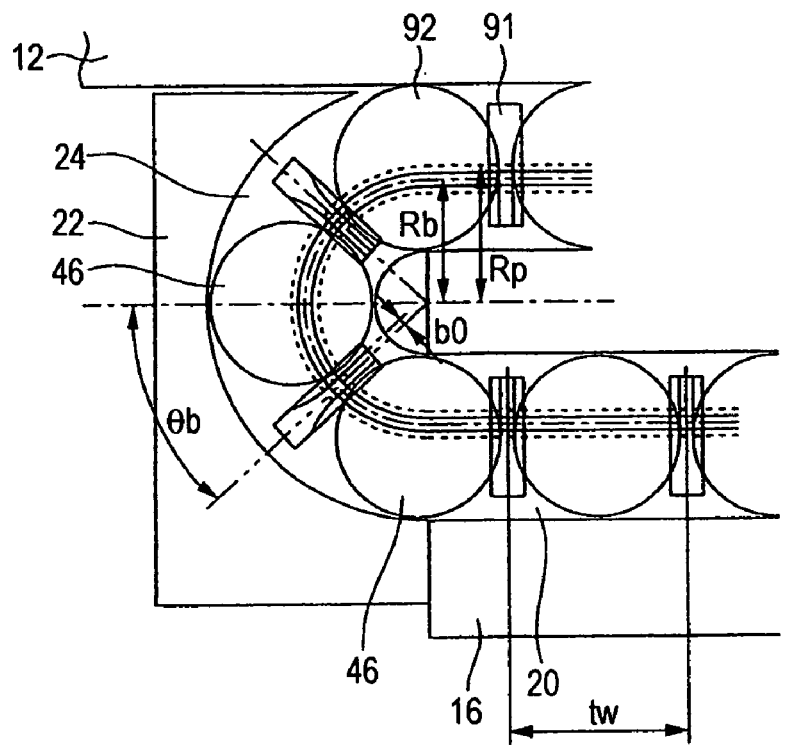
FIG. 20 is a view showing a state in which the connecting member of the rolling element accommodating belt shown in FIG. 19 is elastically deformed into an arcuate shape in the direction change passage of the end cap.

FIG. 20 is a view showing a state in which the connecting member 92 is located in the direction change passage 24 of the end cap 22. In FIG. 20, $R_w$ is a radius of the rolling element, $R_b$ is a radius of curvature (mm) of the connecting member 92 at the time when the connecting member 92 of the rolling element accommodating belt 90 is elastically deformed into an arcuate shape in the direction change passage 24, $R_p$ is a radius (mm) of the central track of the rolling element 64 rolling in the direction change passage 24, tw is a distance between the centers of the spacer members 91 at the time when the connecting member 92 is not elastically deformed, b0 is ½ (mm) of the maximum thickness between the rolling element contact faces 93 formed on both end faces of the spacer member 91, and $\theta_b$ is ½ (rad) of the angle formed by two adjoining spacer members 91 in the direction change passage 24. In this case, when $R_w$=2.38 mm, Rb=3.5 mm, $R_p$=4 mm, tw=5.2 mm, and $\theta_b$=tw/2$R_b$=0.7428 rad, b0 is set in such a manner that b0=0.22 mm in the fourth embodiment of the present invention.

In this structure, in order to prevent the connecting member 92 of the rolling element accommodating belt 90 from being given an excessively strong tensile force, it is necessary that the length of the center line of the connecting member 92 after the connecting member 92 is curved into an arcuate shape in the direction change passage 24 of the end cap 22 is the same as the length of the center line of the connecting member 92 before the connecting member 92 is curved. In order to satisfy the above condition, the following expression must be established.

$$2 \cdot R_b \cdot \theta_b = tw \quad (1)$$

When the connecting member 92 of the rolling element accommodating belt 90 is curved into an arcuate shape in the direction change passage 24 of the end cap 22, a distance between two spacer members 91, which are adjacent to each other, is decreased on the inner circumferential side, and a distance between two spacer members 91, which are adjacent to each other, is increased on the outer circumferential side. Therefore, depending upon the size of the rolling element accommodating belt 90, the spacer member 91 of the rolling element accommodating belt 90 interferes with the rolling element 64 on the inner circumferential side of the direction change passage 24 in some cases. Therefore, in order to prevent the spacer member 91 of the rolling element accommodating belt 90 from interfering with the rolling element 64 on the inner circumferential side of the direction change passage 24, it is necessary that the following expression is established.

$$R_p \cdot \sin \theta_b - R_w \geq b0 \quad (2)$$

In this case, the left side member in Expression (2) can be expressed as follows when $\theta_b$ is substituted from Expression (1).

$$R_p \cdot \sin(tw/2R_b) - R_w \geq b0 \quad (3)$$

In the case where Expression (2) or (3) is not established, the distance between the spacer members 91 is spread out by the rolling elements 64. Therefore, a tensile strength acts on the connecting member 92, and the connecting member 92 may be damaged. Further, since the rolling elements 64 are pushed to the outer circumferential face of the circulating passage, and the circulating resistance is increased and the rolling elements can not be smoothly circulated.

Values of $R_p$, tw, $R_b$ and $R_w$ are substituted into Expression (3) as follows.

$$4 \times \sin(5.2/(2 \times 3.5)) - 2.38 = 0.325 \geq b0$$

In order to prevent the spacer member 91 of the rolling element accommodating belt 90 and the rolling elements 64 from interfering with each other in the direction change passage 24 of the end cap 22, it is necessary to reduce the value of b0 to be lower than 0.325 mm.

As described before, in the fourth embodiment of the present invention, b0=0.22 mm. Therefore, even when the connecting member 92 of the rolling element accommodating belt 90 is elastically deformed into an arcuate shape in the direction change passage 24 of the end cap 22, the spacer member 91 of the rolling element accommodating belt 90 does not interfere with the rolling elements 64 on the inner circumferential side of the direction change passage 24. Accordingly, it is possible to prevent an excessively strong force from being repeatedly given to the connecting member 92 of the rolling element accommodating belt 90.

Figure 21:
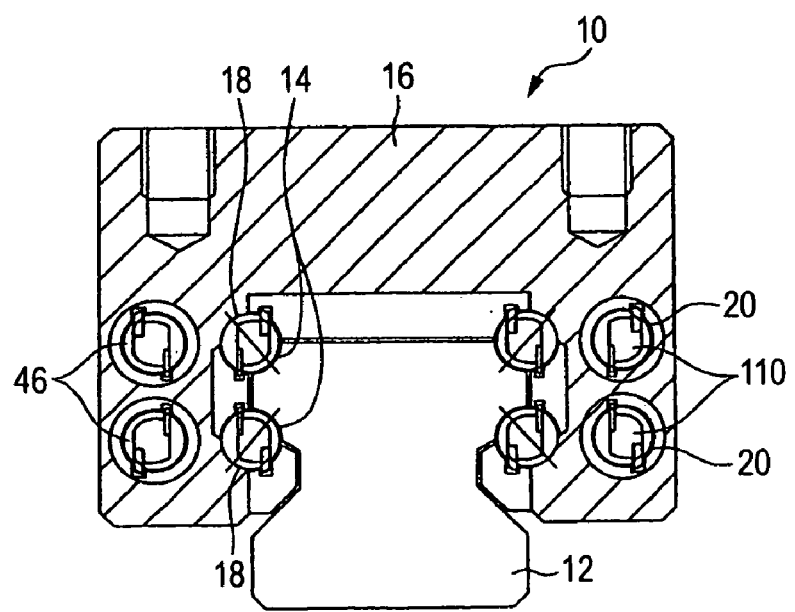
FIG. 21 is a sectional view taken in the width direction of the linear guide of the fifth embodiment of the present invention.
Figure 22:
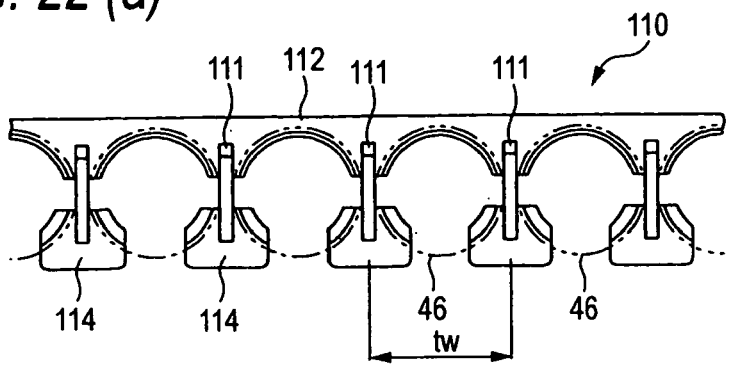
FIG. 22 is a view showing a structure of the rolling element accommodating belt shown in FIG. 21 in detail.
Figure 22:
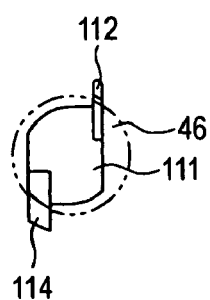
Figure 22:
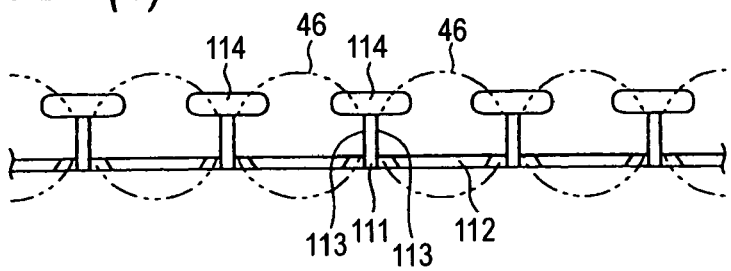
Figure 23:
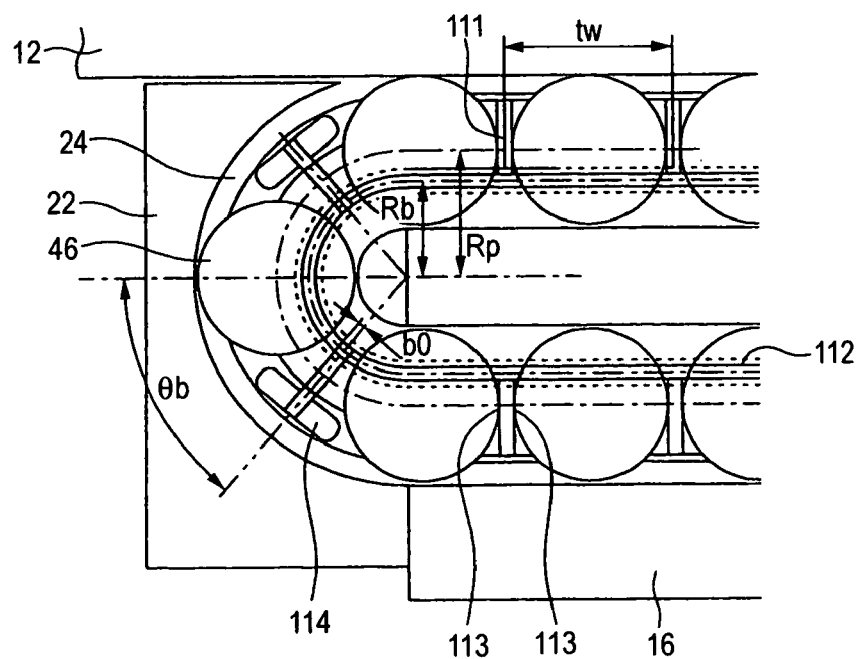
FIG. 23 is a view showing a state in which the connecting member of the rolling element accommodating belt shown in FIG. 22 is elastically deformed into an arcuate shape in the direction change passage of the end cap.
Figure 24:
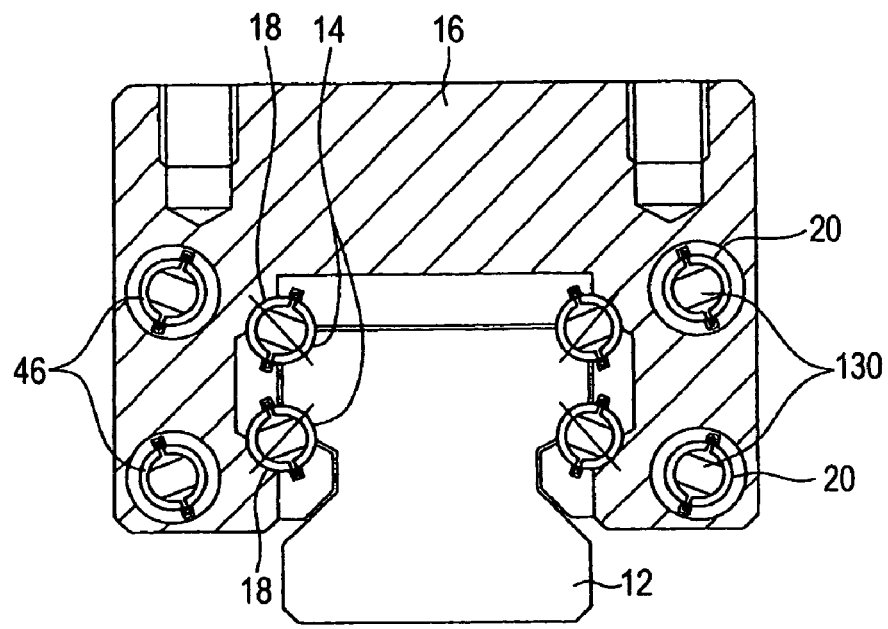
FIG. 24 is a sectional view taken in the width direction of the linear guide of the sixth embodiment of the present invention.

Referring to FIGS. 21 to 23, the fifth embodiment of the linear guide device of the present invention will be explained below.

In this connection, the structure of the track face and the circulating motion of the rolling elements and the structure of the linear guide device except for the rolling element accommodating belt are the same as those of the first and second embodiments described before. Therefore, only the rolling element accommodating belt will be explained here and the other explanations are omitted here.

To be in more detail, the rolling element accommodating belt 110 of the fifth embodiment (shown in FIG. 21) for accommodating the rolling elements 64 is made of resin. As shown in FIG. 22, this rolling element accommodating belt 110 includes: a large number of spacer members 111 provided between the rolling elements 64; and a connecting member 112 for connecting these spacer members 111 in a row at predetermined intervals tw. Each spacer member 111 is formed into a substantial disk-shape, the diameter of which is smaller than the diameter of the rolling element 64. On both end faces of the spacer member 111, the flat rolling element contact face 113 is formed. On the other hand, the connecting member 112 connects the side face portions of the spacer members 111. On the side face portion of the spacer member 111 on the opposite side to the connecting member 112, the arm portion 114 extending in the thickness direction of the spacer member 91 is integrally formed.

FIG. 23 is a view showing a state in which the connecting member 112 is located in the direction change passage 24 of the end cap 22 In FIG. 23, $R_w$ is a radius of the rolling element, $R_b$ is a radius of curvature (mm) of the connecting member 112 at the time when the connecting member 112 of the rolling element accommodating belt 110 is elastically deformed into an arcuate shape in the direction change passage 24, $R_p$ is a radius (mm) of the central track of the rolling element 64 rolling in the direction change passage 24, tw is a distance between the centers of the spacer members 111 at the time when the connecting member 112 is not elastically deformed, b0 is ½ (mm) of the maximum thickness between the rolling element contact faces 113 formed on both end faces of the spacer member 111, and $\theta_b$ is ½ (rad) of the angle formed by two adjoining spacer members 111 in the direction change passage 24. In this case, when $R_w$=2.38 mm, Rb=3 mm, $R_p$=4 mm, tw=5.2 mm, and $\theta_b$=tw/2$R_b$=0.8666 rad, b0 is set in such a manner that b0=0.22 mm in the fifth embodiment of the present invention.

In this structure, in order to prevent the connecting member 112 of the rolling element accommodating belt 110 from being given an excessively strong tensile force, it is necessary that the length of the center line of the connecting member 112 after the connecting member 112 is curved into an arcuate shape in the direction change passage 24 of the end cap 22 is the same as the length of the center line of the connecting member 112 before the connecting member 112 is curved. In order to satisfy the above condition, the following expression must be established.

$$2 \cdot R_b \cdot \theta_b = tw \quad (1)$$

When the connecting member 112 of the rolling element accommodating belt 110 is curved into an arcuate shape in the direction change passage 24 of the end cap 22, a distance between two spacer members 111, which are adjacent to each other, is decreased on the inner circumferential side, and a distance between two spacer members 111, which are adjacent to each other, is increased on the outer circumferential side. Therefore, depending upon the size of the rolling element accommodating belt 110, the spacer member 111 of the rolling element accommodating belt 110 interferes with the rolling element 64 on the inner circumferential side of the direction change passage 24 in some cases. Therefore, in order to prevent the spacer member 111 of the rolling element accommodating belt 110 from interfering with the rolling element 64 on the inner circumferential side of the direction change passage 24, it is necessary that the following expression is established.

$$R_p \cdot \sin \theta_b - R_w \geq b0 \quad (2)$$

In this case, the left side member in Expression (2) can be expressed as follows when $\theta_b$ is substituted from Expression (1).

$$R_p \cdot \sin(tw/2R_b) - R_w \geq b0 \quad (3)$$

In the case where Expression (2) or (3) is not established, the distance between the spacer member 111 is spread out by the rolling elements 64. Therefore, a tensile strength acts on the connecting member 112, and the connecting member 92 may be damaged. Further, since the rolling elements 64 are pushed to the outer circumferential face of the circulating passage, and the circulating resistance is increased and the rolling elements can not be smoothly circulated.

Values of $R_p$, tw, $R_b$ and $R_w$ are substituted into Expression (3) as follows.

$$4 \times \sin(5.2/(2 \times 3)) - 2.38 = 0.669 \geq b0$$

In order to prevent the spacer member 111 of the rolling element accommodating belt 110 and the rolling elements 64 from interfering with each other in the direction change passage 24 of the end cap 22, it is necessary to reduce the value of b0 to be lower than 0.669 mm.

As described before, in the fifth embodiment of the present invention, b0=0.22 mm. Therefore, even when the connecting member 112 of the rolling element accommodating belt 110 is elastically deformed into an arcuate shape in the direction change passage 24 of the end cap 22, the spacer member 111 of the rolling element accommodating belt 110 does not interfere with the rolling elements 64 on the inner circumferential side of the direction change passage 24. Accordingly, it is possible to prevent an excessively strong force from being repeatedly given to the connecting member 112 of the rolling element accommodating belt 110.

Next, referring to FIGS. 24 to 28, the sixth embodiment of the present invention will be explained below.

Figure 25:
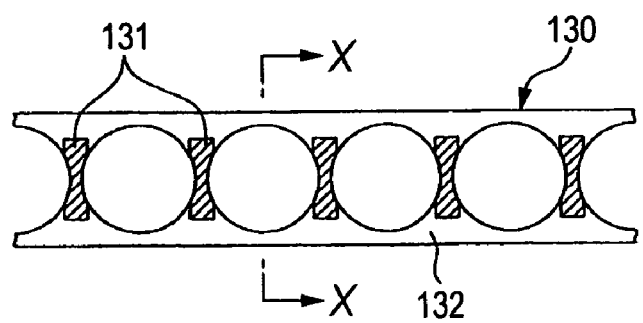
FIG. 25 is a plan view of the rolling element accommodating belt shown in FIG. 24.
Figure 26:
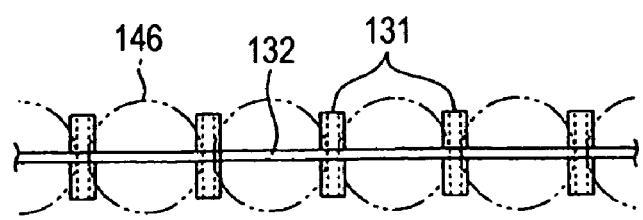
FIG. 26 is a side view of the rolling element accommodating belt shown in FIG. 25.
Figure 27:
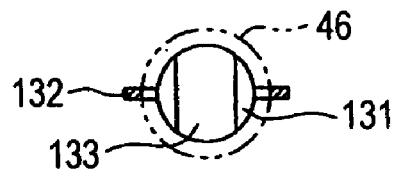
FIG. 27 is a sectional view taken on line X-X in FIG. 25.
Figure 28:
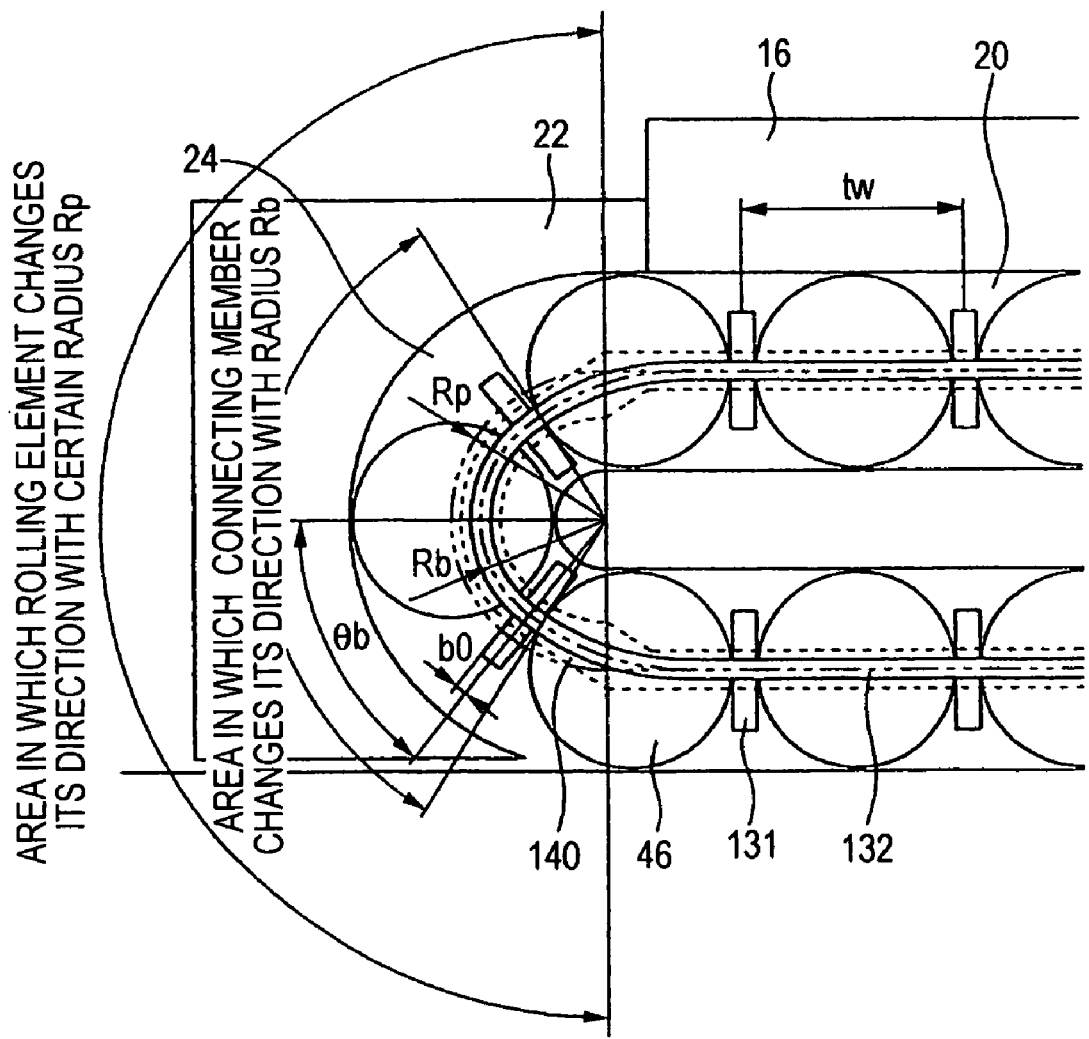
FIG. 28 is a sectional view showing a primary portion of the linear guide shown in FIG. 24.
Figure 29:
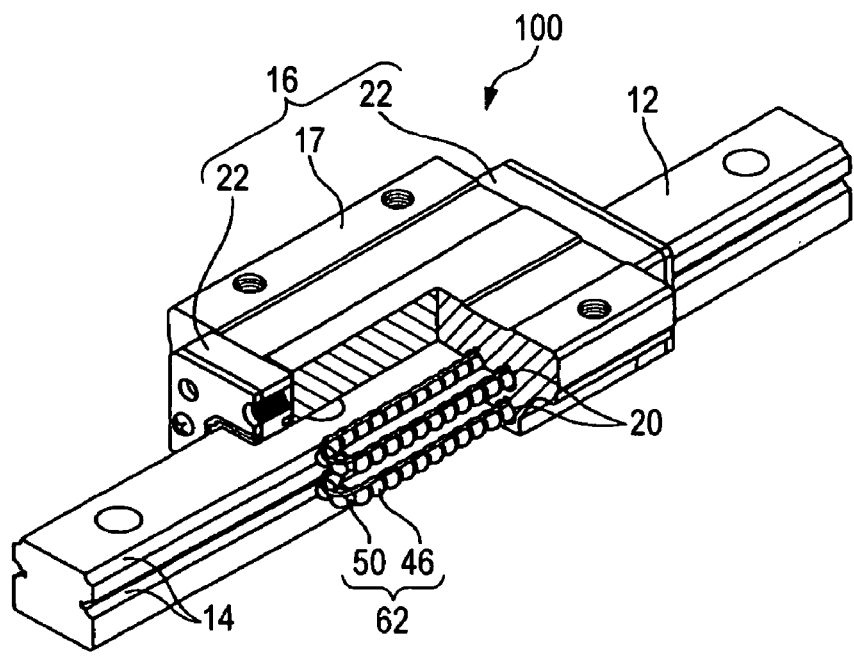
FIG. 29 is a perspective view for explaining a related-art linear guide, wherein a portion is shown being broken in this view.
Figure 30:
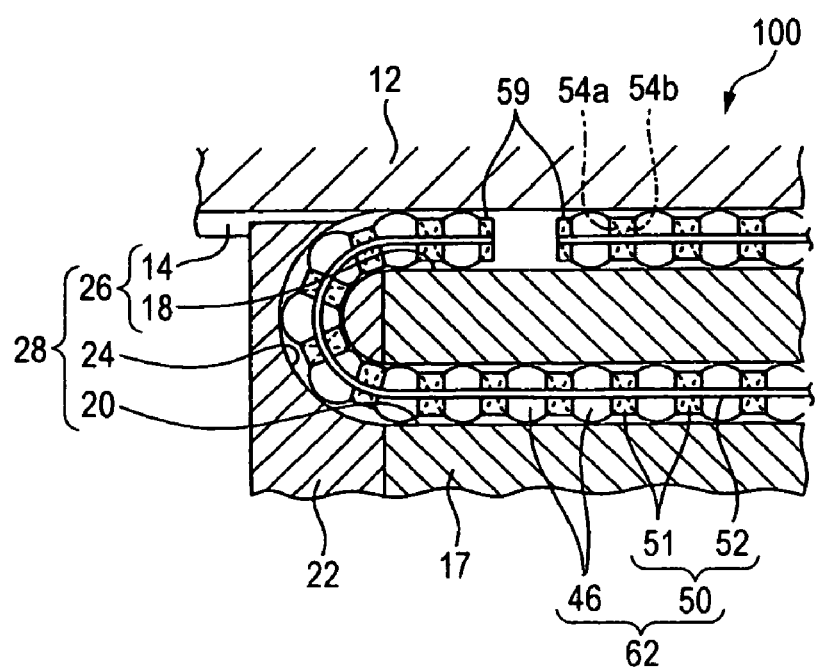
FIG. 30 is a view for explaining a related-art linear guide and is a sectional view showing a portion of the rolling element row taken in the direction of a plane view of FIG. 29.
Figure 31:
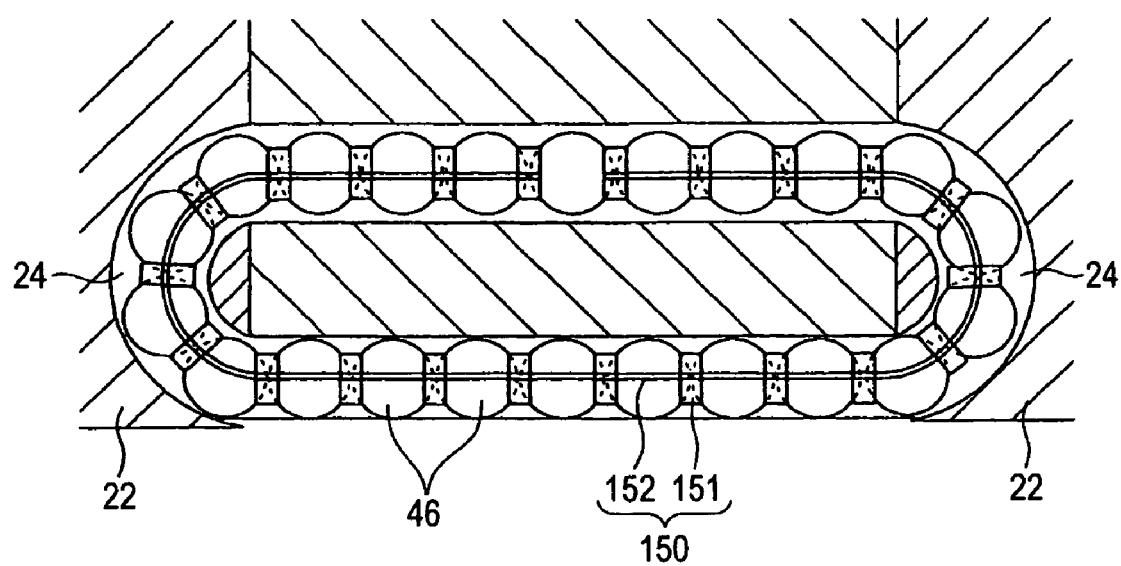
FIG. 31 is a view showing a related-art linear guide.
Figure 32:
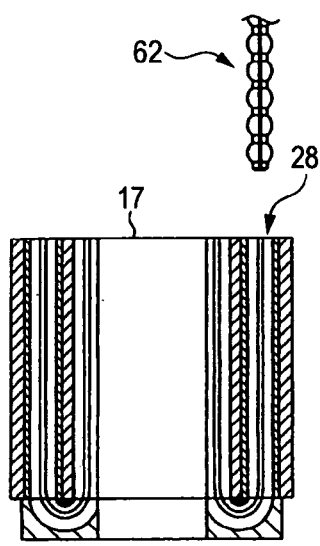
FIG. 32 is a view for explaining a procedure of incorporating a rolling element row into each infinite circulating passage in the method of manufacturing a related-art linear guide and for explaining a work to execute the procedure.
Figure 32:
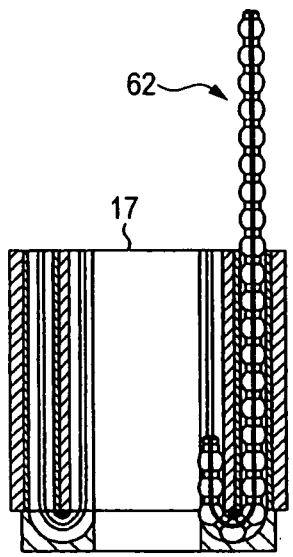
Figure 32:
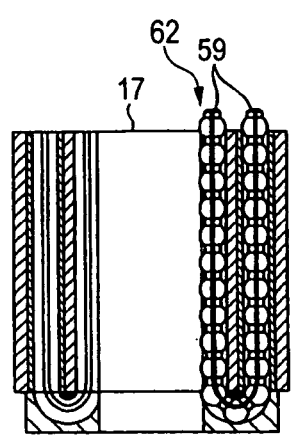
Figure 32:
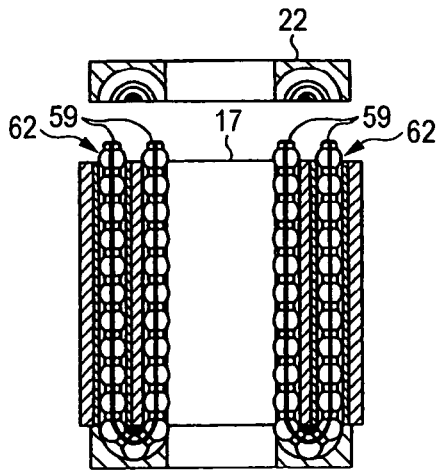
Figure 32:
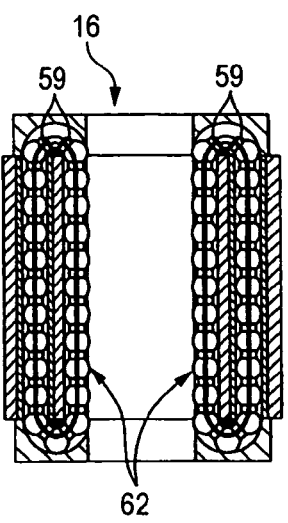
Figure 32:
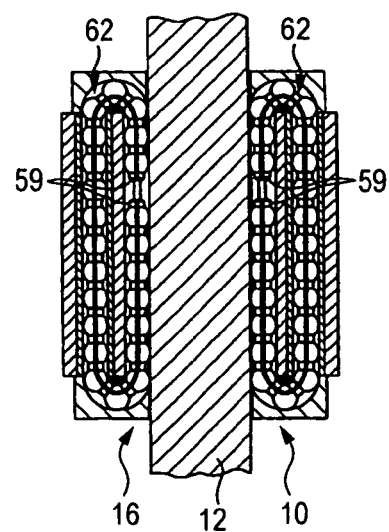

The structure of the track face and the circulating motion of the rolling elements are the same as those of the fourth and the fifth embodiment described before. The rolling elements are accommodated in the rolling element accommodating belt 130. As shown in FIGS. 25 to 27, this rolling element accommodating belt 130 includes: a large number of spacer members 131 provided between the rolling elements 64; and a connecting member 132 for connecting these spacer members 131 at predetermined intervals tw. In this case, each spacer member 131 is formed into a substantial disk-shape, the diameter of which is smaller than the diameter of the rolling element 64. On both end faces of this spacer member 131, the cylindrical rolling element contact faces 133 are formed. On the other hand, the width of the connecting member 132 is larger than the diameter of the rolling element 64. As shown in FIG. 28, in the direction change passage 24 of the end cap 22, the connecting member 132 is elastically deformed. In the linear passage in which the connecting member 132 is not elastically deformed, the connecting member 132 is located at the same position as the central track of the rolling elements 64. However, at the position close to the center of the direction change passage 24, the connecting member 132 is located on the inner circumferential side with respect to the central track of the rolling elements 64. In order to maintain the connecting member 132 and the rolling elements 64 in this relation, a guide groove 140 (shown in FIG. 28) of the connecting member 132 may be formed in the direction change passage 24 so that the connecting member 132 can be gradually moved to the inner circumferential side as it comes close to the center of the direction change passage 24. In this embodiment, the guide groove 140 of the connecting member 132 is formed into an arcuate shape in the neighborhood of the direction change passage 24. Accordingly, the connecting member 132 is elastically deformed into an arcuate shape in the neighborhood of the direction change passage 24.

In FIG. 28, $R_w$ is a radius of the rolling element, $R_b$ is a radius of curvature (mm) of the connecting member 132 at the time when the connecting member 132 of the rolling element accommodating belt 130 is elastically deformed into an arcuate shape in the direction change passage 24, $R_p$ is a radius (mm) of the central track of the rolling element 64 rolling in the direction change passage 24, tw is a distance between the centers of the spacer members 131 at the time when the connecting member 132 is not elastically deformed, b0 is ½ (mm) of the maximum thickness between the rolling element contact faces 133 formed on both end faces of the spacer member 131, and $\theta_b$ is ½ (rad) of the angle formed by two adjoining spacer members 131 in the direction change passage 24. In this case, when $R_w$=2.38 mm, Rb=3 mm, $R_p$=3.75 mm, tw=5.4 mm, and $\theta_b$=tw/2$R_b$=0.9 rad, b0 is set in such a manner that b0=0.32 mm in the sixth embodiment of the present invention.

In the same manner as that of the first and the fifth embodiment, in order to prevent an excessively strong force from being given to the connecting member 132 of the rolling element accommodating belt 130, it is necessary that Expression (1) is established. In order to prevent the connecting member 132 of the rolling element accommodating belt 130 from interfering with the direction change passage 24 on the inner circumferential side, it is necessary that Expressions (1) and (2) are established.

When values of $R_p$, tw, $R_b$ and $R_w$ are substituted into Expression (3), the expression of 3.75×sin(5.4/(2×3))−2.38=0.557≧b0 is obtained. In order to avoid the occurrence of interference of the spacer members 131 of the rolling element accommodating belt 130 with the rolling elements 64, it is necessary that b0 is made to be smaller than 0.557 mm.

In the sixth embodiment of the present invention, b0=0.32 mm as described before. Accordingly, even when the connecting member 132 of the rolling element accommodating belt 130 is elastically deformed into an arcuate shape in the direction change passage 24 of the end cap 22, there is no possibility that the spacer members 131 of the rolling element accommodating belt 130 interferes with the rolling elements 64 on the inner circumferential side of the direction change passage 24. Accordingly, it is possible to prevent an excessively strong force from being repeatedly given to the connecting member 132 of the rolling element accommodating belt 130.

In this connection, in the fourth to sixth embodiments, the rolling elements are spherical. However, even in the case where the rolling elements are cylindrical, the same effect can be provided. Further, the rolling element accommodating belt is not limited to the above fourth to sixth embodiments. For example, the rolling element accommodating belt may have end portions which are opposed to each other not coming into contact with each other, or may have the end portions which are connected to each other. Further, the rolling element accommodating belt may have the structures described in the first to third embodiments.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

I claim:

1. A linear guide device comprising:
   a guide rail having a rolling element guide face;
   a slider arranged capable of being moved relatively with respect to the guide rail, having a load rolling element guide face forming a rolling element track passage together with the rolling element guide face being opposed to the rolling element guide face, also having a pair of direction change passages respectively continuing to both end portions of the rolling element tack passage, also having a rolling element return passage communicated with the pair of the direction change passages; and
   a plurality of rolling elements rolling and circulating in an infinite circulating passage composed of the rolling element track passage, the pair of direction change passage and the rolling element return passage; and
   a rolling element accommodating belt having a plurality of rolling element accommodating sections for individually accommodating the rolling elements, the rolling element accommodating belt accommodating the rolling elements in the rolling element accommodating sections and aligning the rolling elements in an aligning direction in the infinite circulating passage, the rolling element accommodating belt having end portions, wherein
   the linear guide device has a plurality of rows of infinite circulating passages, and the phase of an end portion of the rolling element accommodating belt of at least one row of the plurality of rows of the infinite circulating passages in the aligning direction is different from the phase of the end portion of the rolling element accommodating belt of the other infinite circulating passage in the aligning direction.

2. The linear guide device according to claim 1, wherein when an end portion of at least one row of the rolling element accommodating belt in one infinite circulating passage is located in the rolling element track passage, an end portion of at least one row of the rolling element accommodating belt in the other infinite circulating passage is located at a position except for the rolling element tack passage.

3. The linear guide device according to claim 1, wherein the plurality of rows of the infinite circulating passages respectively have only one rolling element accommodating belt.

4. The linear guide device according to claim 1, wherein both end portions of the rolling element accommodating belt are opposed to each other in the infinite circulating passage being not coming into contact with each other.

5. The linear guide device according to claim 1, wherein the rolling element accommodating section of the rolling element accommodating belt restrains the accommodated rolling element in all azimuths so that the accommodated rolling element can not come off.

6. The linear guide device according to claim 1, wherein the rolling element accommodating section of the rolling element accommodating belt allows all the accommodated rolling elements or a portion of the accommodated rolling elements to come off at least in one azimuth.

* * * * *